(12) United States Patent
Khandkar et al.

(10) Patent No.: US 11,194,761 B2
(45) Date of Patent: *Dec. 7, 2021

(54) OPTIMIZING UTILIZATION OF A TABLESPACE FOR EXPORTING FROM A FOREIGN DATABASE RECOVERY ENVIRONMENT

(71) Applicant: Rubrik, Inc., Palo Alto, CA (US)

(72) Inventors: Snehal Arvind Khandkar, Palo Alto, CA (US); Yongbing Guo, Saratoga, CA (US); Udbhav Prasad, Mountain View, CA (US)

(73) Assignee: Rubrik, Inc., Palo Alto, CA (US)

(*) Notice: Subject to any disclaimer, the term of this patent is extended or adjusted under 35 U.S.C. 154(b) by 47 days.

This patent is subject to a terminal disclaimer.

(21) Appl. No.: 16/777,039

(22) Filed: Jan. 30, 2020

(65) Prior Publication Data
US 2021/0240661 A1 Aug. 5, 2021

(51) Int. Cl.
| G06F 16/11 | (2019.01) |
| G06F 16/2457 | (2019.01) |
| G06F 16/182 | (2019.01) |
| G06F 16/22 | (2019.01) |
| G06F 16/17 | (2019.01) |

(52) U.S. Cl.
CPC .......... *G06F 16/128* (2019.01); *G06F 16/113* (2019.01); *G06F 16/1734* (2019.01); *G06F 16/1824* (2019.01); *G06F 16/2282* (2019.01); *G06F 16/24573* (2019.01)

(58) Field of Classification Search
CPC .. G06F 16/285; G06F 16/183; G06F 11/1451; G06F 2201/80

USPC .................................................. 707/640, 652
See application file for complete search history.

(56) References Cited

U.S. PATENT DOCUMENTS

| 6,847,983 B2* | 1/2005 | Somalwar | G06F 11/1435 |
| | | | 707/624 |
| 7,099,900 B1* | 8/2006 | Bromley | G06F 11/1451 |
| | | | 707/652 |
| 7,406,473 B1* | 7/2008 | Brassow | H04L 67/1097 |
| 7,937,547 B2* | 5/2011 | Liu | G06F 12/16 |
| | | | 711/162 |

(Continued)

*Primary Examiner* — Shahid A Alam
(74) *Attorney, Agent, or Firm* — Schwegman Lundberg & Woessner, P.A.

(57) ABSTRACT

Systems and methods to optimize utilization of a tablespace for export from a native database recovery environment are described. The system receives a database from a source host, operating in a native database recovery environment, at a backup host operating in a foreign database recovery environment. The foreign database recovery environment utilizes foreign snapshot files and foreign incremental files for storing the database. The system receives a tablespace identifier that identifies a tablespace and a point-in-time that identifies file information for export from the backup host to the source host. The backup host initiates a job to generate script information; create directories; materialize the file information; utilize an auxiliary database to generate tablespace metadata information; and communicate the tablespace metadata information and the script information and the file information, via the directories, and over a network, to the source host, to enable the source host to recover the tablespace.

20 Claims, 23 Drawing Sheets

(56) References Cited

U.S. PATENT DOCUMENTS

| | | | |
|---|---|---|---|
| 2002/0120785 A1* | 8/2002 | Somalwar | G06F 11/1451 719/310 |
| 2011/0218968 A1* | 9/2011 | Liu | G06F 11/1453 707/649 |
| 2012/0323854 A1* | 12/2012 | Schreter | G06F 11/1461 707/650 |
| 2013/0117554 A1* | 5/2013 | Ylonen | H04L 9/0891 713/151 |
| 2014/0325267 A1* | 10/2014 | Liu | G06F 11/1469 714/15 |

* cited by examiner

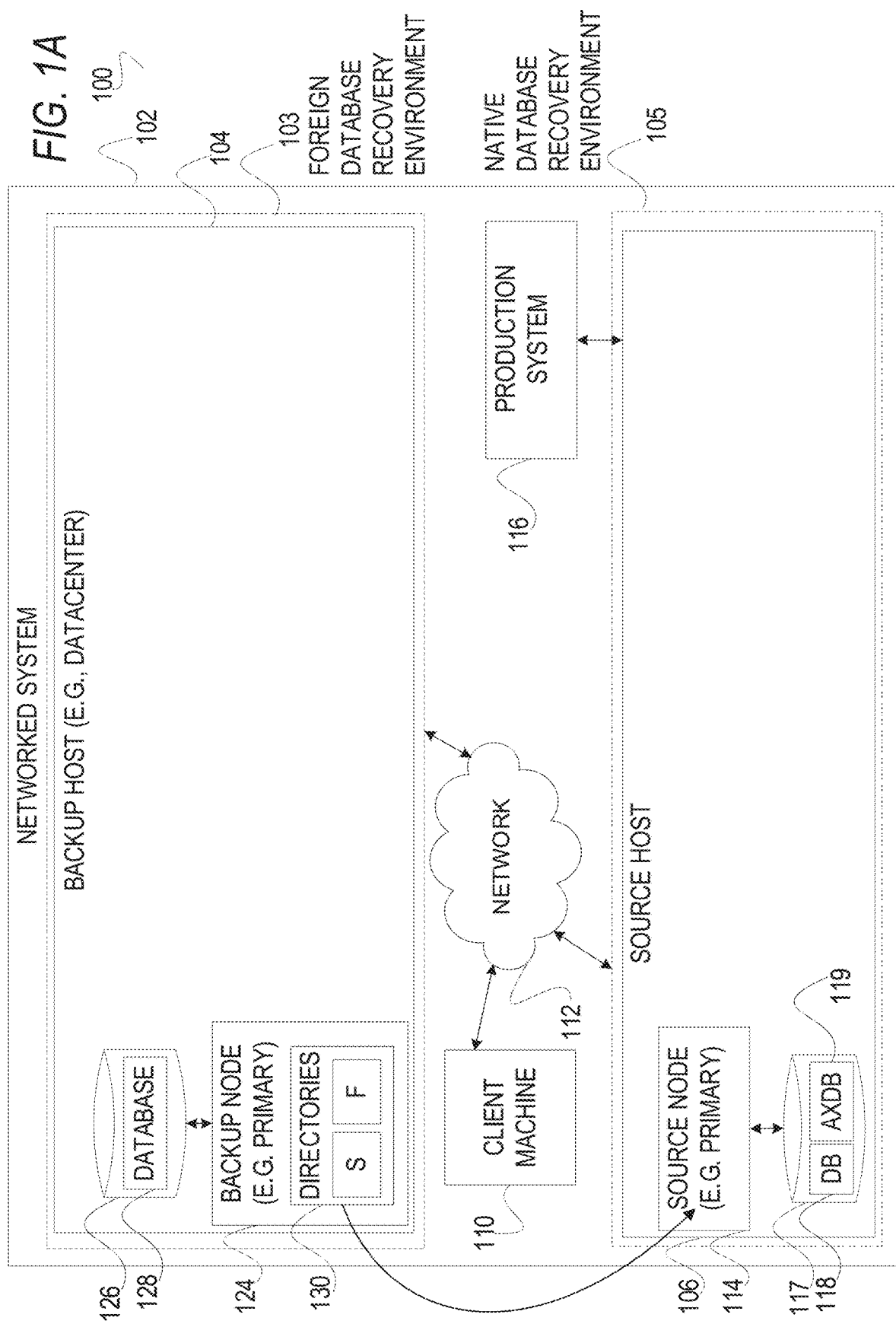

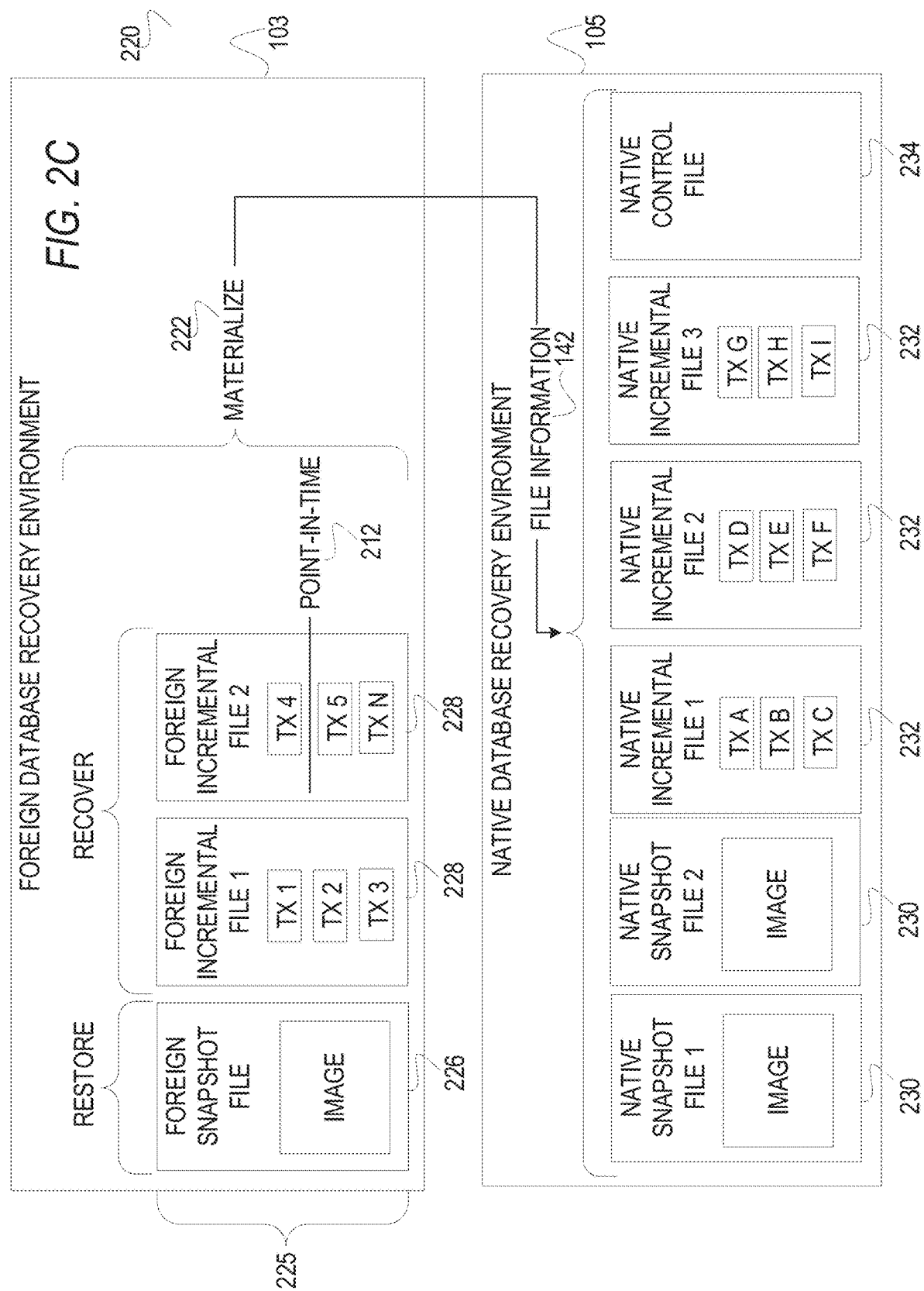

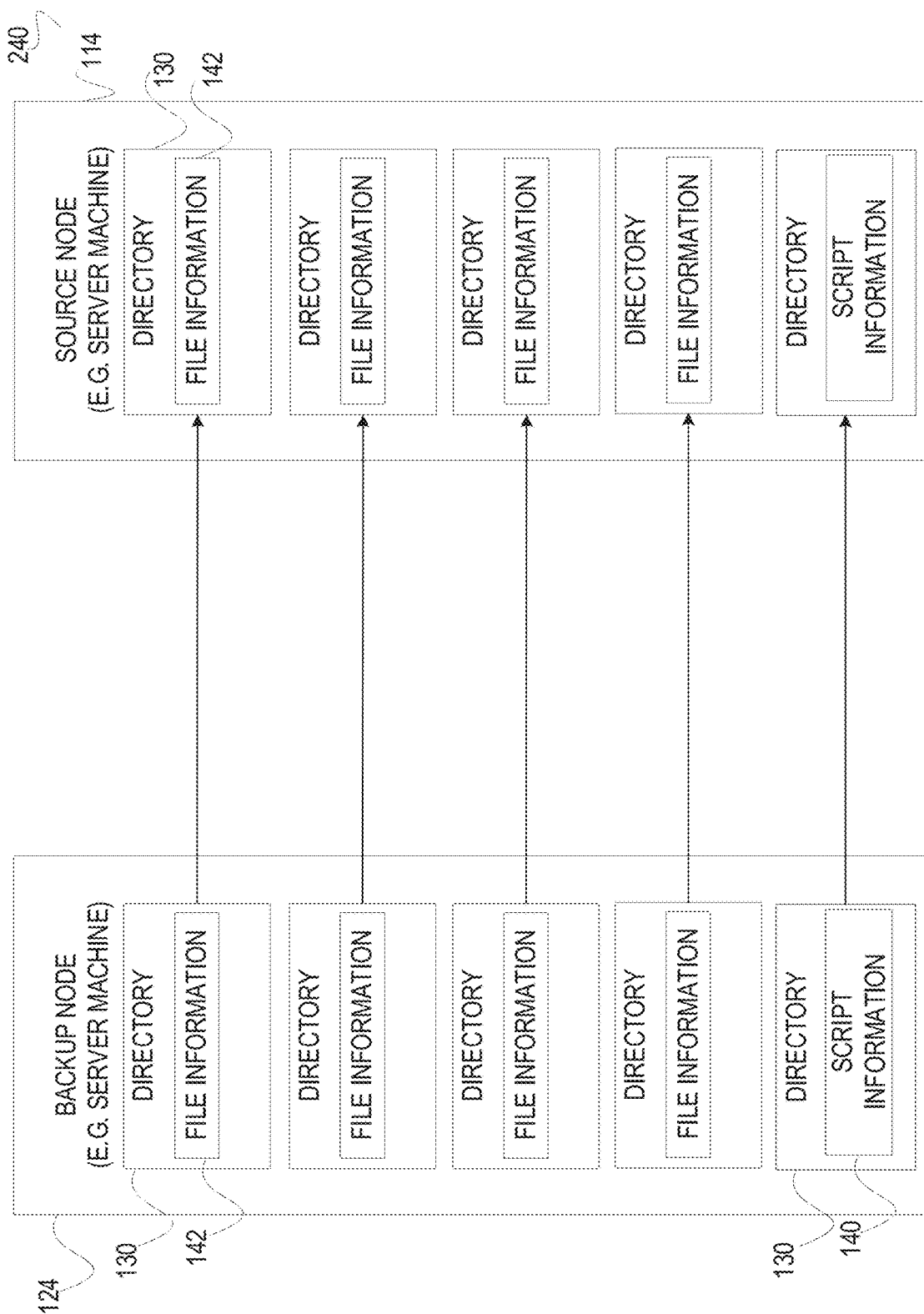

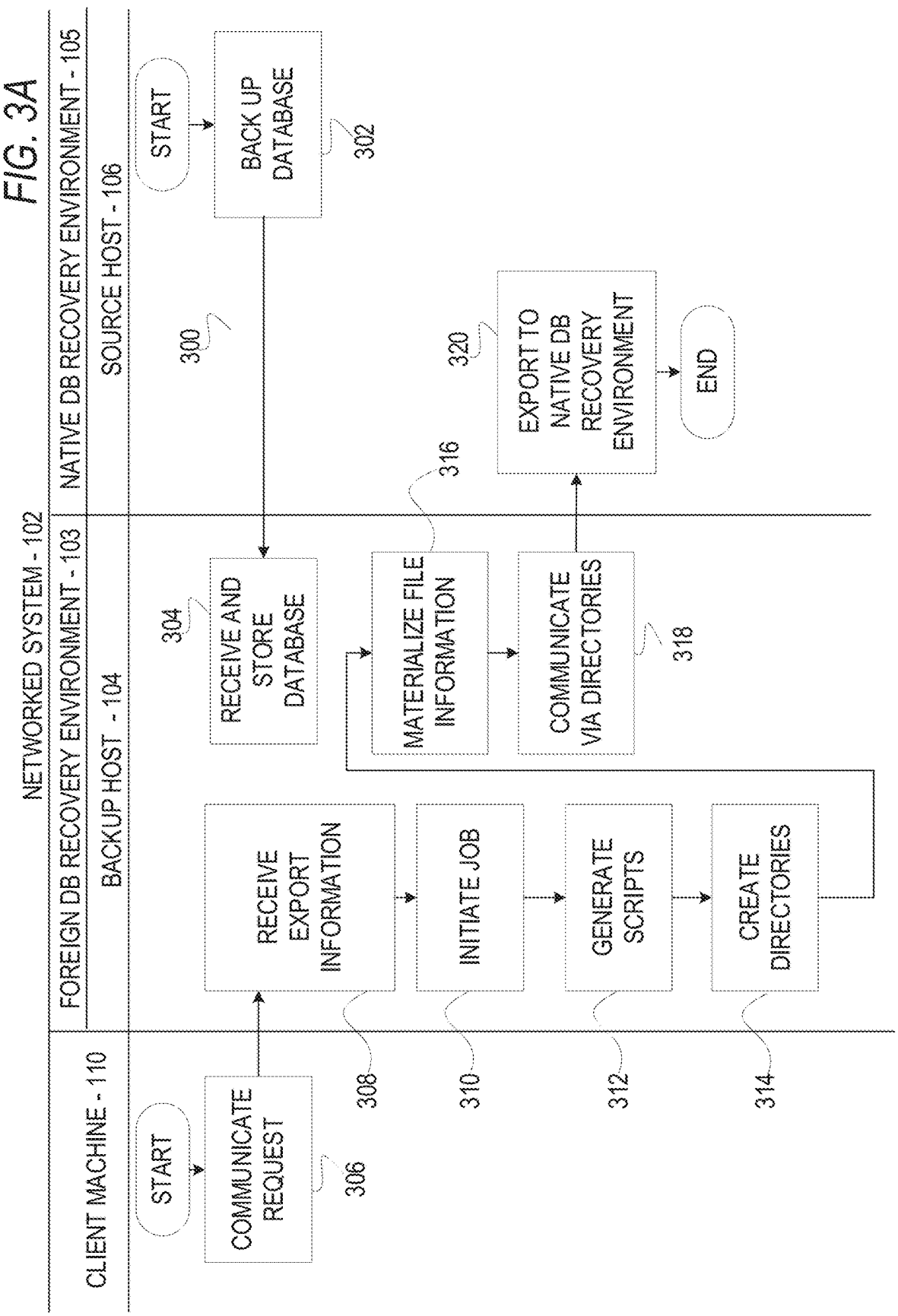

400

RECOVERY POINTS

402

TODAY　　　　　　　　　　　　　　　　YEAR MONTH DAY

JANUARY 21, 2020

404

12:00AM　　6:00AM　　12:00PM　　6:00PM　　12:00AM

406

5 : 19 : 35 AM　　EXPIRATION DATE
　　　　　　　　　　1/15/20

XYZ DATABASE 216

TEMP

TABLESPACE_1 221

TABLESPACE_2 221

TABLESPACE3

RECOVERY POINTS

402

TODAY                                          YEAR MONTH DAY

JANUARY 21, 2020

404

12:00AM      6:00AM      12:00PM      6:00PM      12:00AM 406
5  : 19  : 35  AM    EXPIRATION DATE
                     1/15/20

XYZ DATABASE  216

TEMP

TABLESPACE_1  221                              408

TABLESPACE_2  221                          | RECOVER |

TABLESPACE3

420

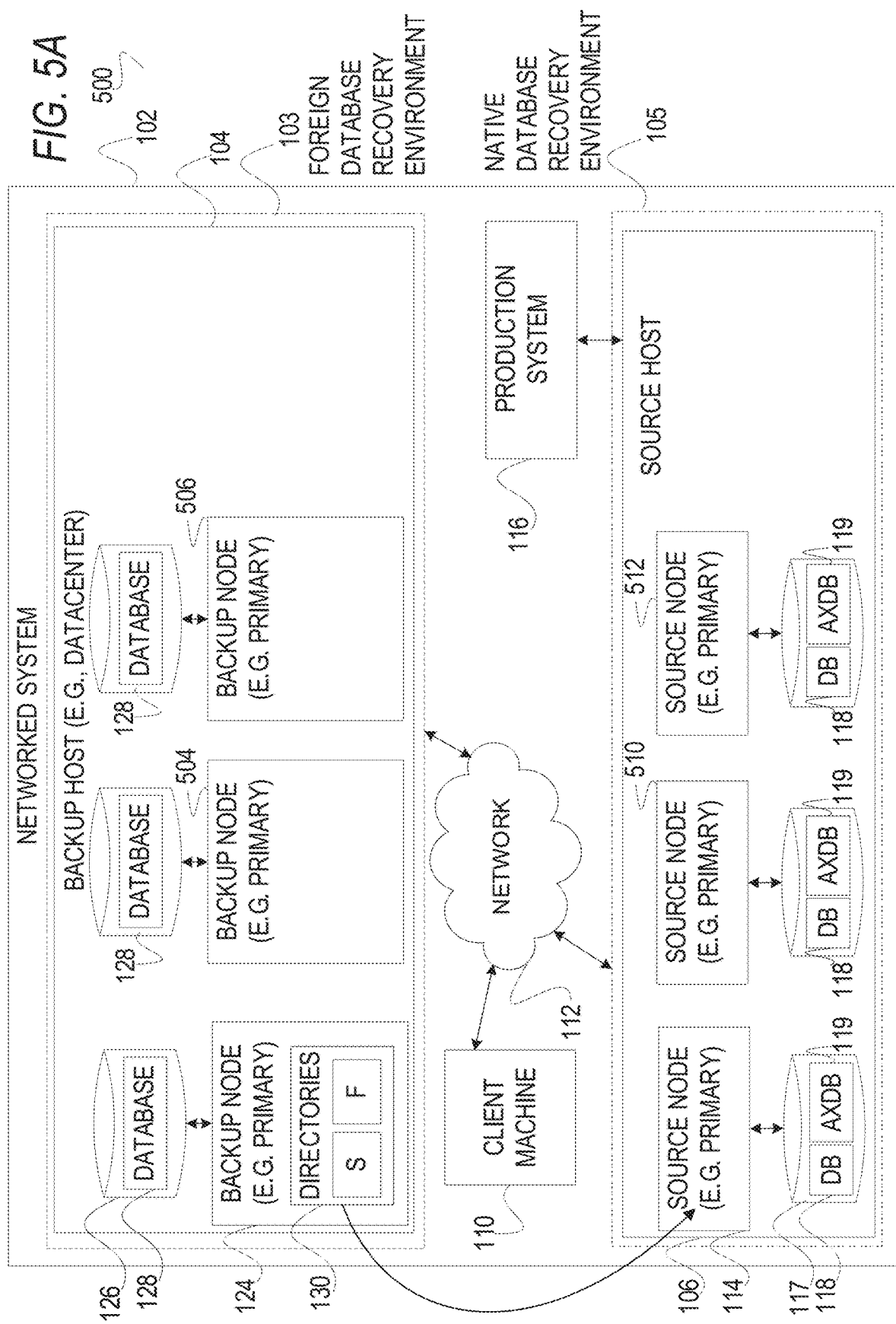

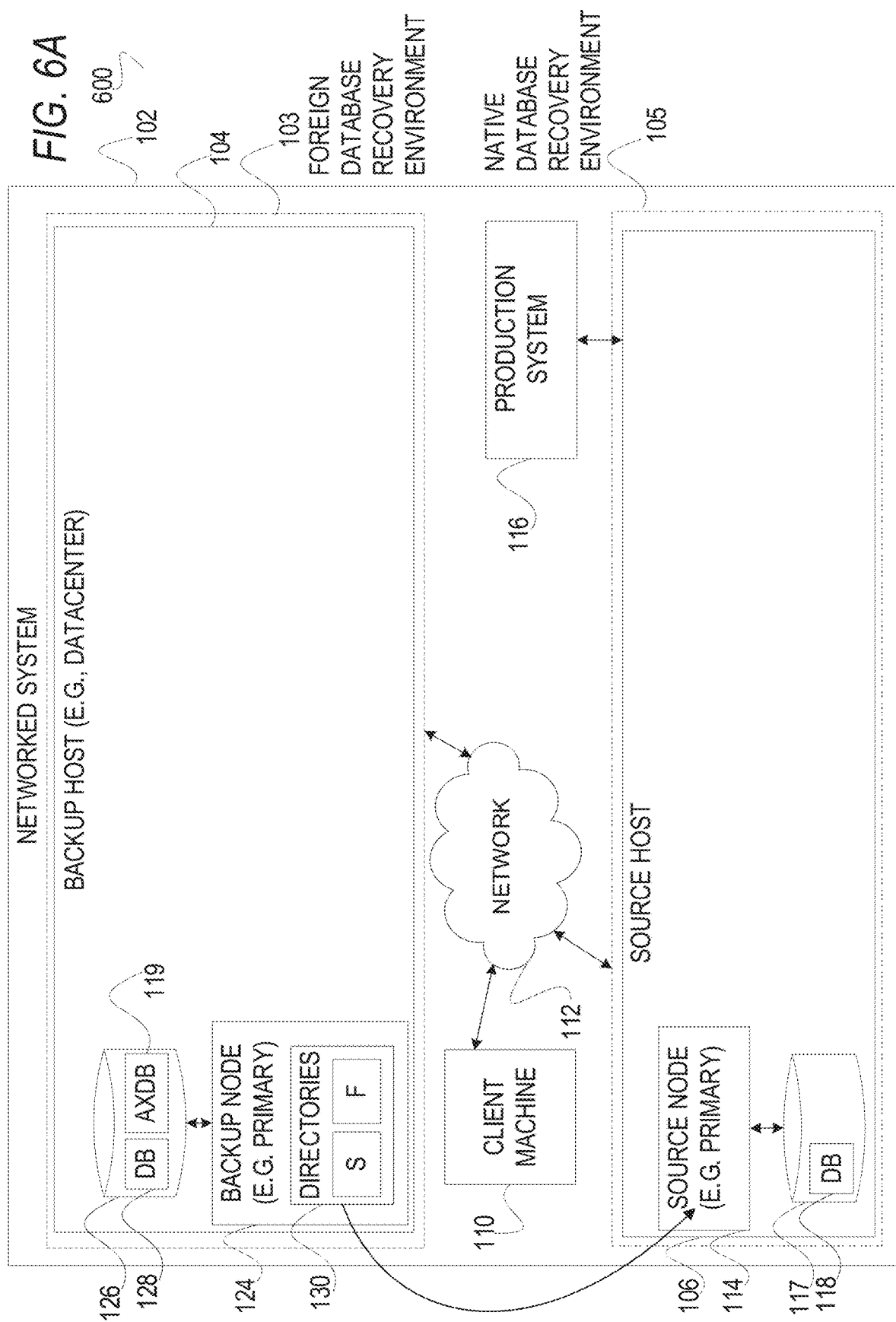

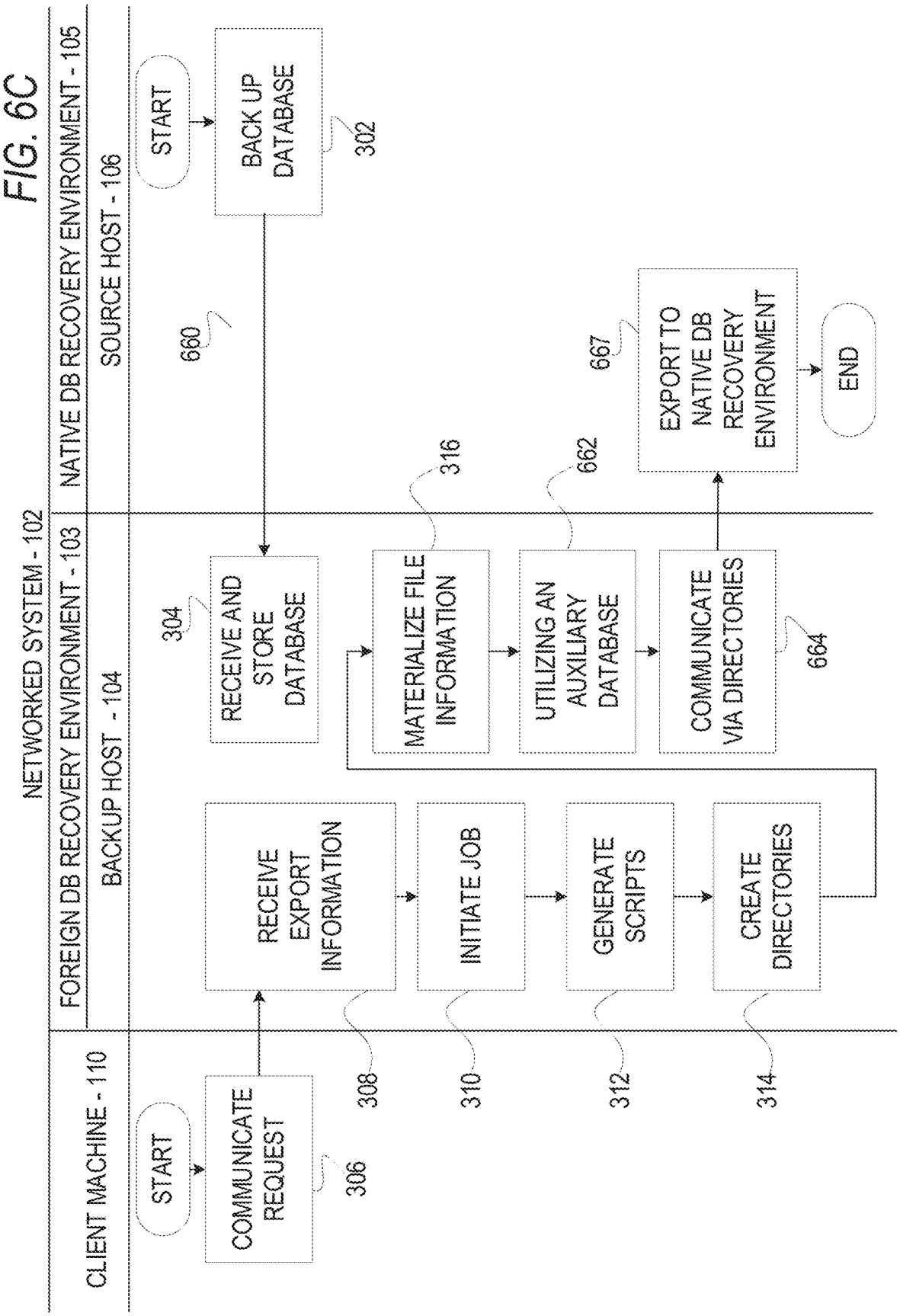

OPTIMIZING UTILIZATION OF A TABLESPACE FOR EXPORTING FROM A FOREIGN DATABASE RECOVERY ENVIRONMENT

TECHNICAL FIELD

This disclosure relates to the technical field of database maintenance and more particularly to optimizing utilization of a tablespace for export from a native database recovery environment.

BACKGROUND

Real-time critical applications hosted by enterprise resource planning (ERP) systems, customer resource management (CRM) systems, and the like require the ability to instantly recover, test, and analyze their data. Any single database recovery system may not satisfy these requirements.

BRIEF DESCRIPTION OF THE DRAWINGS

FIG. 1A is a block diagram illustrating a system, according to an embodiment, to utilize a tablespace for export;

FIG. 2C is a block diagram illustrating processing, according to an embodiment, to materialize file information;

FIG. 2D is a block diagram illustrating processing, according to an embodiment, to communicate via directories;

FIG. 3A is a block diagram illustrating a method, according to an embodiment, for exporting a tablespace from a foreign database recovery environment;

FIG. 5A is a block diagram illustrating a system, according to an embodiment, to export a tablespace from a foreign database recovery environment utilizing a cluster database;

FIG. 6A is a block diagram illustrating a system, according to an embodiment, for optimizing utilization of a tablespace for export from the foreign database recovery environment;

FIG. 6C is a block diagram illustrating a method, according to an embodiment, for optimizing utilization of a tablespace for export from a foreign database recovery environment;

DETAILED DESCRIPTION

Figure 1B:
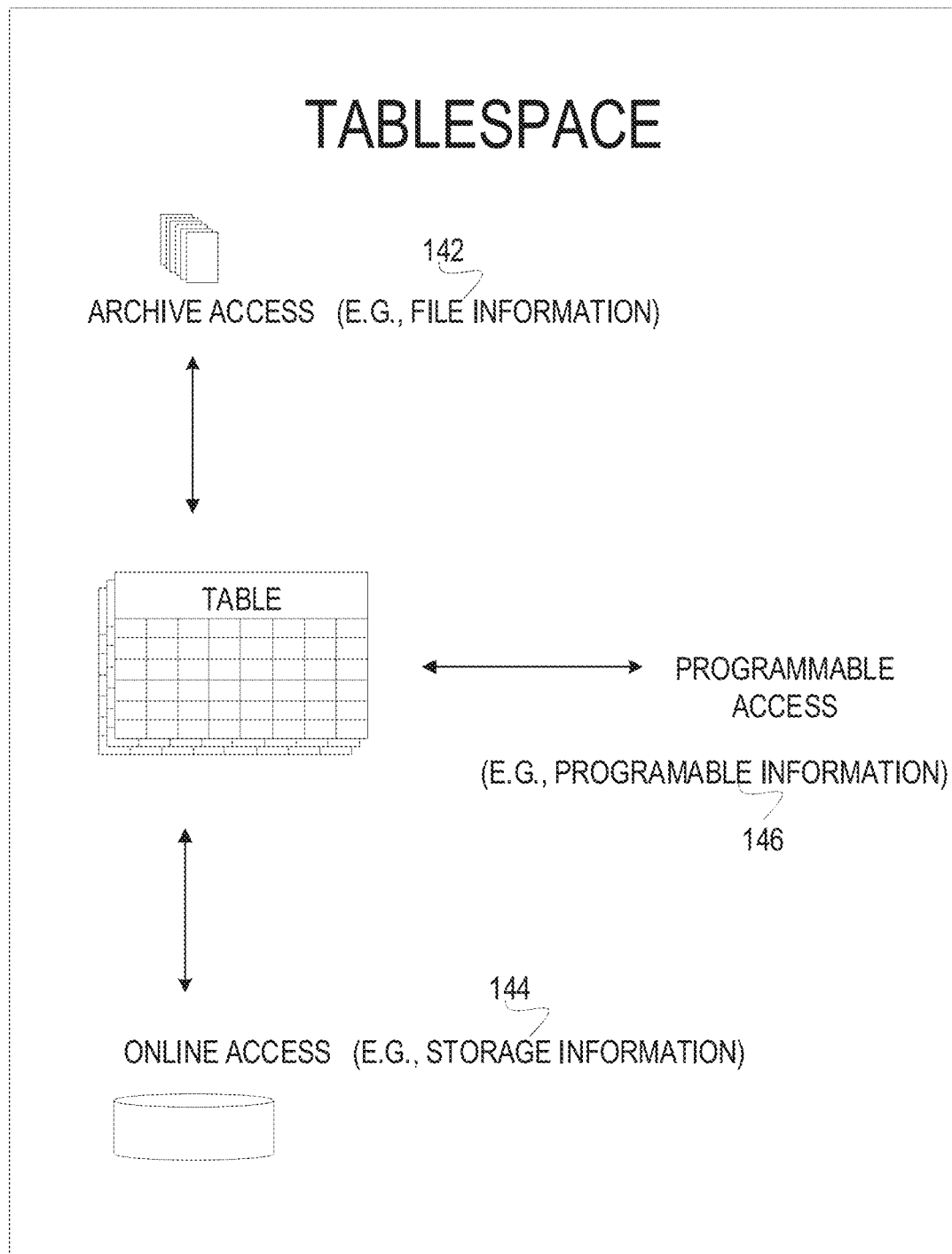
FIG. 1B is a block diagram illustrating a tablespace, according to an embodiment.

This description is directed at three aspects of data communications for exporting of a tablespace. The first aspect includes utilizing a tablespace for exporting from a foreign database recovery environment; the second aspect includes utilizing a tablespace for exporting to a native database recovery environment; and the third aspect includes optimizing utilization of a tablespace for export from a foreign database recovery environment.

Utilizing a Tablespace for Export from a Foreign Database Recovery Environment

According to a first aspect of the present disclosure, a tablespace is utilized for exporting from a foreign database recovery environment. A backup host receives a database from a source host operating in a native database recovery environment. The backup host operates in a foreign database recovery environment and utilizes foreign snapshot files and foreign incremental files for restoring and recovering the database. The backup host receives export information including a tablespace identifier and a point-in-time. The tablespace identifier and the point-in-time are used to identify a tablespace including file information for export from the backup host to the source host operating in the native database recovery environment. The backup host initiates a job responsive to receiving the export information. The job executes to generate script information and file information based on the export information. The script information includes one or more scripts including logic for execution on the source host to recover the tablespace, at the point-in-time, in the database on the source host in the native database recovery environment. In addition, the job executes to create one or more directories on the backup host based on the export information and materialize the file information on the backup host. The file information includes snapshots of the database and incremental changes to the database. Finally, the job executes to communicate the file information and the script information, via the directories, and over a network, to the source host. The directories and the script information enable the source host to restore and recover the tablespace, at the point-in-time, in the database on the source host in the native database recovery environment.

Utilizing a Tablespace for Export to a Native Database Recovery Environment

According to a second aspect of the present disclosure, a tablespace is utilized for exporting to a native database recovery environment. A backup host receives a database from a source host operating in a native database recovery environment. The backup host operates in a foreign database recovery environment and utilizes foreign snapshot files and foreign incremental files for restoring and recovering the database. The source host receives file information and script information, over a network, via directories. The source host operates in a native database recovery environment. The script information includes one or more scripts that execute, at the source host, to perform operations comprising: mounting the directories, opening an auxiliary database, restoring a tablespace in the auxiliary database based on the native snapshot files and a tablespace identifier identifying the tablespace, recovering the tablespace in the auxiliary database based on the native incremental files, exporting the tablespace metadata information from the auxiliary database, importing the tablespace metadata to the database, restoring the tablespace in the database based on the file information, recovering the tablespace in the database based on the file information, and unmounting the directories.

Utilizing a Tablespace for Export from a Foreign Database Recovery Environment

According to a third aspect of the present disclosure, an optimization in utilizing a tablespace for exporting to a native database recovery environment is described. A backup host receives a database from a source host operating in a native database recovery environment. The backup host operates in a foreign database recovery environment and utilizes foreign snapshot files and foreign incremental files for restoring and recovering the database. The backup host receives export information including a tablespace identifier that identifies a tablespace. The tablespace includes tablespace metadata information and a point-in-time that identifies file information for export from the backup host to the source host operating in the native database recovery environment. The backup host initiates a job responsive to receiving the export information. The job executes to generate script information based on the export information. The script information includes one or more scripts including logic for execution on the source host to import the tablespace metadata information, at the point-in-time, to the database on the source host. The job further executes to create directories, materialize the file information including native snapshot files and native incremental files, create an auxiliary database, restore the tablespace in the auxiliary database based on the file information, recover the tablespace in the auxiliary database based on the file information, export tablespace metadata information from the auxiliary database, and communicate the tablespace metadata information, the script information, and the file information, via the directories, and over a network, to the source host, to enable the source host to recover the tablespace in the database in the native database recovery environment.

FIG. 1A is a block diagram illustrating a system 100, according to an embodiment, to utilize a tablespace for export. The system 100 includes a networked system 102 including a foreign database recovery environment 103, a native database recovery environment 105, a client machine 110 and a production system 116. The foreign database recovery environment 103 includes a backup host 104 and the native database recovery environment 105 includes a source host 106.

The backup host 104, the source host 106, and the client machine 110 may communicate over a network 112. The backup host 104 is utilized to back up a tablespace that is stored in a database 118 that, in turn, is communicatively coupled to the source host 106. In addition, a user may utilize the client machine 110 to request the backup host 104 to utilize the tablespace for export from the backup host 104 to the source host 106 at a point-in-time that is selected by the user.

The source host 106 includes a source node 114 (e.g., server machine) (e.g., PRIMARY) that is communicatively coupled to the production system 116 and a storage device 117 that stores the database 118. The storage device 117 further includes an auxiliary database 119 that may be utilized for exporting the tablespace, at a point-in-time, from the foreign database recovery environment 103 to the native database recovery environment 105. The database 118 is a standalone database without replicates; however, in another embodiment, the database 118 may include a cluster database embodied in replicates, as described later. The source host 106 receives data from applications that execute on the production system 116, stores the data in the database 118, and facilitates management of the database 118. For example, the source host 106 provides sophisticated database services for the applications that execute on the production system 116, including backup services for the database 118. Further for example, responsive to detecting a corruption in the database 118, a database crash, or the like, the source node 114 may restore and recover the database 118 by utilizing files that are stored on the source node 114 or in the database 118. Accordingly, the source node 114, in the native database recovery environment 105, may restore and recover the database 118 by storing files in the database 118 that are utilized to restore and recover the production system 116. In addition, the source host 106 may utilize the backup services provided by the foreign database recovery environment 103. For example, the source host 106 may utilize the foreign database recovery environment 103 (e.g., backup host 104) to identify file information based on the tablespace, at the point-in-time, and export the file information from the backup host 104 to the source host 106. For example, responsive to the backup host 104 receiving a request from the client machine 110 to export the tablespace, at the point-in-time, the source node 114 receives script information and file information, via directories, from the backup host 104. According to one example, the source host 106 executes the scripts to restore and recover the tablespace, at the point-in-time, based on the file information.

The source host 106 includes a source node 114 (e.g., server machine) that is communicatively coupled to a storage device 117 that stores the database 118 that, in turn, stores the tablespace. Responsive to the backup host 104 receiving a request from the client machine 110 to utilize the tablespace for export to the source host 106, 1) the backup host 104 generates script information (e.g., "S") and file information (e.g., "F"); 2) the backup host 104 communicates the script information (e.g., "S") and the file information (e.g., "F"), via directories 130, to the source host 106; 3) the source node 114 receives the script information (e.g., "S") and the file information (e.g., "F"), via directories 130, from the backup host 104; 4) the source node 114 executes the scripts on the source host 106 to create, restore, and recover the tablespace, at the point-in-time, on the source host 106, based on the file information.

The backup host 104 includes a backup node 124 (e.g., server machine) that is communicatively coupled to a storage device 126 that stores a database 128. The backup host 104 is included in a foreign database recovery environment 103 which provides sophisticated database backup services for the native database recovery environment 105. For example, the backup host 104 may receive the database 118, including the tablespace, from the source host 106 and store the database 118 in the database 128. Further for example, the backup host 104 may receive export information from the client machine 110. The export information may include a request to utilize a tablespace for export of file information from the backup host 104 to the source host 106. The export information further includes a point-in-time that identifies a date-time for restoring and recovering the tablespace on the source host 106 based on the file information. According to one example, responsive to receiving export information including a request to export the tablespace, a tablespace identifier that identifies the tablespace, and a point-in-time, the backup node 124 initiates a job that generates script information including scripts (e.g. "S"), creates directories 130, materializes file information (e.g., "F") from the database 128 based on the tablespace, stores the script information and file information in the directories 130, and communicates the script information and the file information, via the directories 130, over the network 112, to the source node 114. The source node 114 receives the script information, including scripts, and the file information from the backup host 104 and utilizes the one or more scripts to process the file information to restore and recover the tablespace to the point-in-time in the database 118 in the storage device 117 coupled to the source host 106.

The networked system 102 may be embodied as a networked computing environment where the backup node 124, the source node 114, the client machine 110, and the production system 116 are interconnected through one or more public and/or proprietary networks (e.g., Microsoft® provider of Azure Cloud Computing Platform & Services, Amazon provider of Amazon Web Services, and the like). According to another embodiment, the system 100 may be implemented as a single software platform.

The foreign database recovery environment 103 may be embodied as a networked computing environment offered by Rubrik Inc., of Palo Alto, Calif. For example, the foreign database recovery environment 103 may be implemented as a software platform that delivers backup, instant recovery, archival, search, analytics, compliance, and copy data management in one secure fabric across data centers and clouds as offered by Rubrik Inc., of Palo Alto, Calif.

The native database recovery environment 105 may be embodied as a networked computing environment offered by Oracle Inc., of Redwood City, Calif. For example, the native database recovery environment 105 may be implemented as a software platform that develops and builds tools for database development and systems of middle-tier software, enterprise resource planning software, human capital management software, customer relationship management software, and supply chain management software, as offered by Oracle Inc., of Redwood City, Calif.

FIG. 1B is a block diagram illustrating a tablespace 132, according to an embodiment. The tablespace 132 is an abstraction layer that may be mapped to physical files and logical database information. The physical files may include file information 142 and storage information 144. The logical database information may include programmable information 146.

The programmable information 146 may be utilized to access logical database entities stored in the database 118. For example, the programmable information 146 may be utilized by the applications that execute on the production system 116. According to an embodiment, the programmable information 146 may include table information (e.g., table names) and object information (e.g., object names). The table names may be utilized by the applications to identify one or more tables included in the database 118. For example, a table name may be utilized for identifying a shipping table in a wholesale distribution database. In another example, an object name may be utilized for reading shipping information (e.g., table information) from a row in the shipping table and/or writing the shipping information (e.g., table information) to the row in the shipping table. The programmable information 146 may further include tablespace metadata information including metadata for describing, configuring, and controlling tablespace entities included in the file information 142 (e.g., native snapshot files, native incremental files, native control file, and the like), tablespace entities included in the programmable information 146 (e.g., tables, objects, and the like), and tablespace entities included in the storage information 144 included in the tablespace 132 (e.g., segments, extents, blocks, and the like).

The file information 142 includes files that are utilized to archive, restore and recover the tablespace 132. For example, the file information 142 may include one or more files (e.g., native snapshot files) for restoring the tablespace 132 in the database 118 and one or more files (e.g., native incremental files) for recovering the image of the tablespace 132 in the database 118. According to an embodiment, the tablespace 132 may include the shipping table. Accordingly, the tablespace 132 may include file information 142 for restoring the image of the database 118 including the shipping table and for recovering the image of database 118 including the shipping table.

The storage information 144 may be utilized to access the tablespace 132 online. For example, the storage information 144 may include segments, extents, and database blocks that are utilized to access the tablespace 132 online. According to an embodiment, a segment is a set of extents allocated for a specific type of programmable information 146 (e.g., shipping table). A segment may span across files included in the storage information 144. According to an embodiment, an extent is a number of contiguous data blocks allocated for storing a specific type of programmable information 146 (e.g., shipping table). The extent may be contiguous data blocks that do not span across files. According to an embodiment, a data block is the smallest unit of data used by an operating system to request data. According to an embodiment, an operating system has a block size.

According to an embodiment, the file information 142 may be transformed to the storage information 144 and to the programmable information 146. According to an embodiment, the programmable information 146 may be transformed to the storage information 144 and to the file information 142. According to an embodiment, the storage information 144 may be transformed to the file information 142 and to the programmable information 146.

According to an embodiment, the size of the database 118 may be increased by adding a new tablespace 132 to the database 118. According to an embodiment, the size of the database 118 may be increased by adding a file (included in the file information 142) to the tablespace 132. According to an embodiment, the size of the tablespace 132 may be increased by increasing the size of a file (included in the file information 142) included in the tablespace 132.

According to an embodiment, the size of the database 118 may be decreased by removing a tablespace 132 from the database 118. According to an embodiment, the size of the database 118 may be decreased by removing a file (included in the file information 142) from the tablespace 132. According to an embodiment, the size of the tablespace 132 may be decreased by decreasing the size of a file (included in the file information 142) included in the tablespace 132.

Figure 1C:
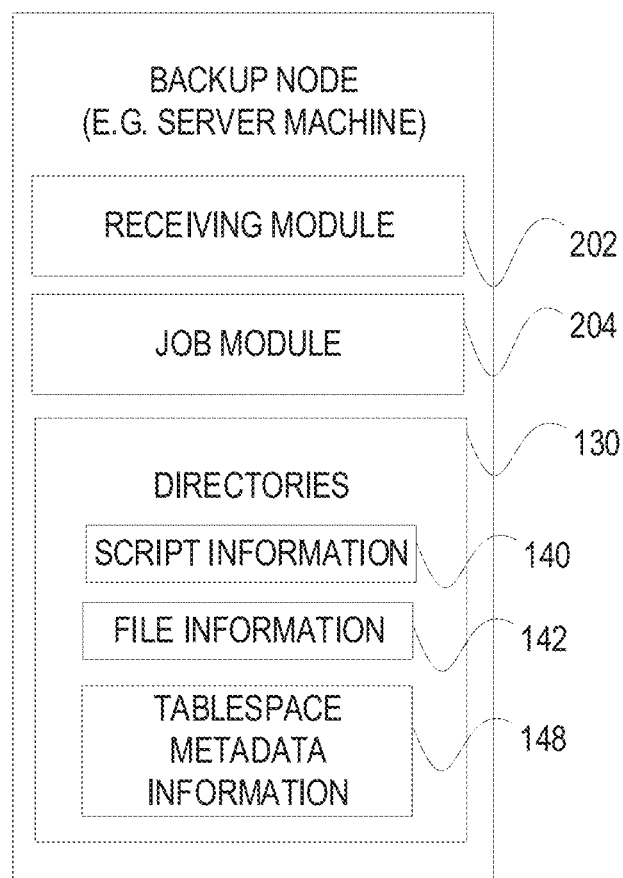
FIG. 1C is a block diagram illustrating a backup node, according to an embodiment.

FIG. 1C is a block diagram illustrating the backup node 124, according to an embodiment. The backup node 124 may include a receiving module 202, a job module 204, and directories 130. The receiving module 202 may receive input (e.g., user) in the form of export information including a request to export the tablespace 132, a database name identifying the database 118, a tablespace name identifying the tablespace 132, a point-in-time (e.g., date-time) to recover the tablespace 132, and an identifier identifying a source host 106. The job module 204 may be initialized for execution responsive to receiving the export information. The job module 204 executes to generate the script information 140, create the directories 130, materialize the file information 142, store the script information 140 and the file information 142 in the directories 130, and communicate the script information 140 and the file information 142, via the directories 130, to the source node 114. The script information 140 includes scripts that execute on the source host 106. The file information 142 includes files that are utilized to restore and recover the tablespace 132 in the database 118 at the source host 106. According to the embodiment for optimizing utilization of the tablespace 132 for export from the foreign database recovery environment 103, the backup node 124 may further generate the tablespace metadata information 148 and communicate the tablespace metadata information 148, via the directories 130, to the source host 106.

Figure 1D:
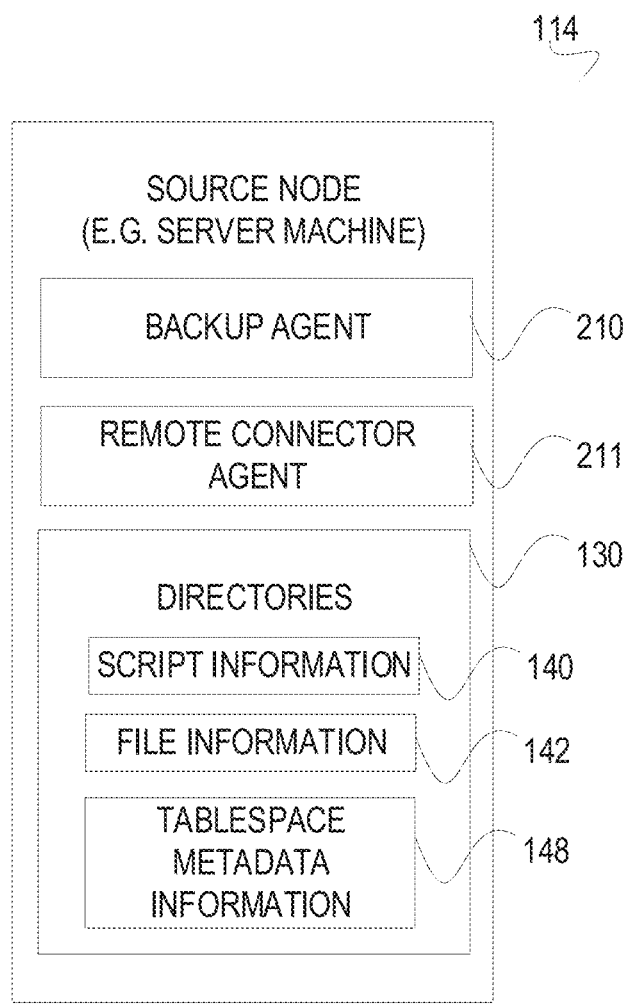
FIG. 1D is a block diagram illustrating a source node, according to an embodiment.

FIG. 1D is a block diagram illustrating the source node 114, according to an embodiment. The source node 114 may include a backup agent 210, a remote connector agent 211, and the directories 130. The backup agent 210 may be communicated to the source node 114 from the backup node 124. The backup agent 210 executes to communicate snapshots of images of the database 118 and incremental updates to the image of the database 118 to the backup node 124. The directories 130 are temporarily created by the backup node 124 on the source node 114 to enable an export of the tablespace 132, in the form of file information 142, to the source node 114. Each directory 130 includes script information 140 or file information 142. The script information 140 includes scripts. The file information 142 includes native snapshot file(s), native incremental file(s), and a native control file. The remote connector agent 211 may be utilized to identify the scripts in the directories 130 and cause execution of the one or more scripts to mount the directories 130, open an auxiliary database, restore the tablespace 132 in the auxiliary database based on the native snapshot files, recover the tablespace 132 in the auxiliary database 119 based on the native incremental files, export the tablespace metadata information 148 from the auxiliary database 119, import the tablespace metadata information 148 to the database 118, restore the tablespace 132 in the database 118 based on the native snapshot files, recover the tablespace 132 in the database 118 based on the native incremental files, and unmount the directories 130.

According to the embodiment for optimizing utilization of the tablespace 132 for export from the foreign database recovery environment 103, the source node 114 may further generate tablespace metadata information 148 and communicate the tablespace metadata information 148, via the directories 130, to the source host 106. Each directory 130 includes the script information 140 or the file information 142 or the tablespace metadata information 148. The script information 140 includes scripts. The file information 142 may include native snapshot file(s), native incremental file(s), and a native control file. The remote connector agent 211 may be utilized to identify the one or more scripts in the directories 130 and cause execution of the one or more scripts to mount the directories 130, import the tablespace metadata information 148 to the database 118, restore the tablespace 132 in the database 118 based on the native snapshot files, recover the tablespace 132 in the database 118 based on the native incremental files, and unmount the directories 130.

Figure 2A:
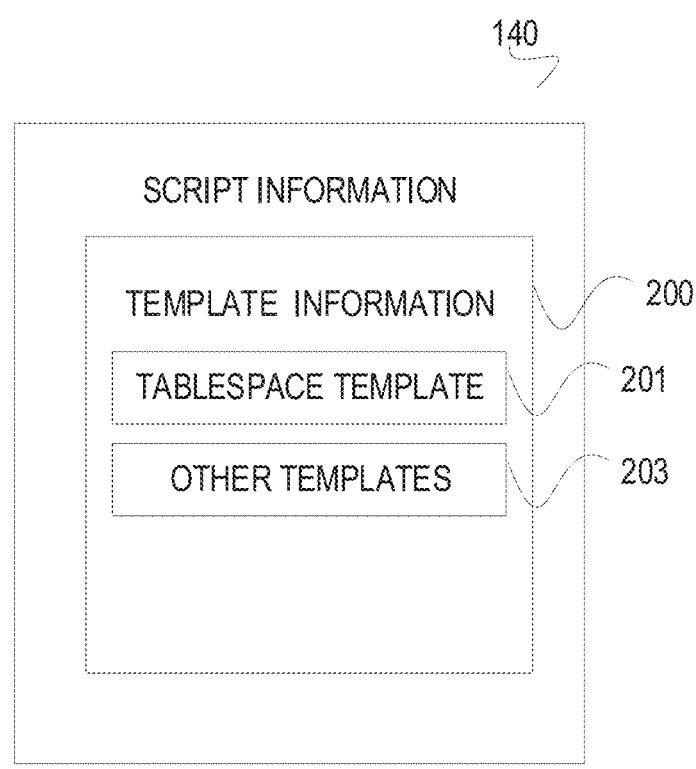
FIG. 2A is a block diagram illustrating script information, according to an embodiment.

FIG. 2A is a block diagram illustrating script information 140, according to an embodiment. The script information 140 may include template information 200 that may be utilized to create or generate a script. The template information 200 includes a tablespace template 201 and other templates 203. The tablespace template 201 may be selected based on input (e.g., export information). For example, the tablespace template 201 may be selected responsive to receiving user input to utilize the tablespace 132 to export from the foreign database recovery environment 103 to the source host 106.

Figure 2B:
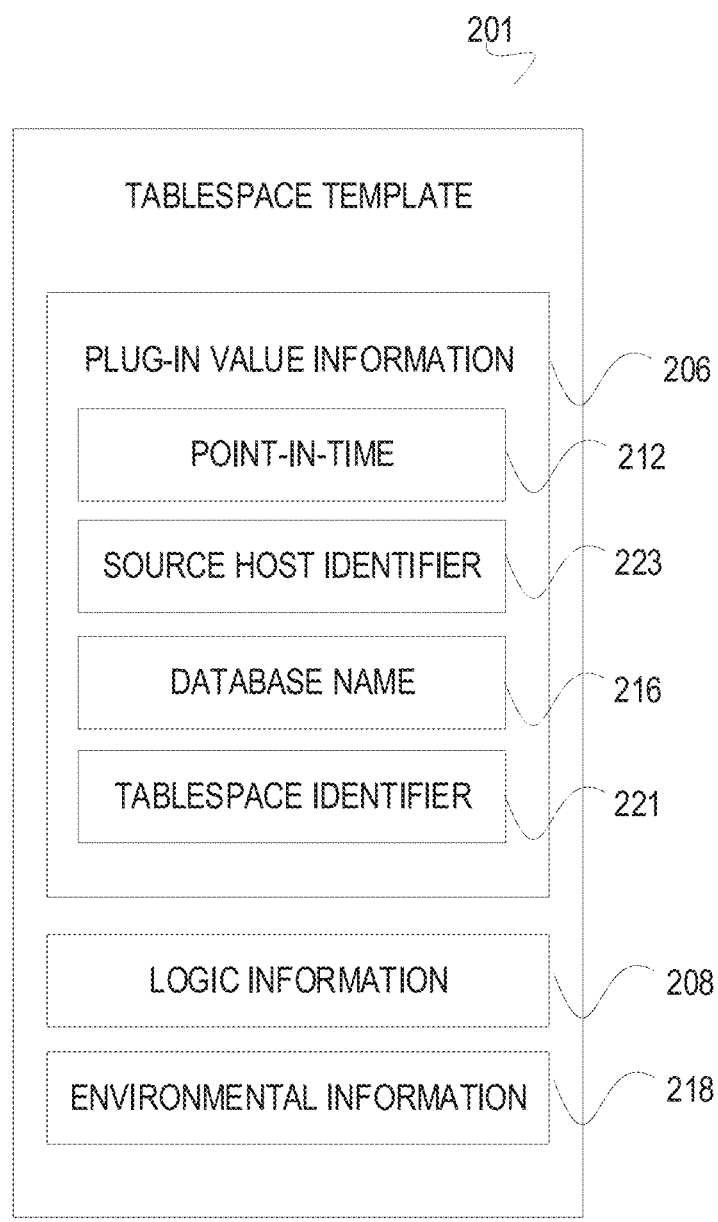
FIG. 2B is a block diagram illustrating a tablespace template, according to an embodiment.

FIG. 2B is a block diagram illustrating a tablespace template 201, according to an embodiment. The tablespace template 201 is utilized to restore and recover the tablespace 132 at a point-in-time in the database 118 on the source host 106. The tablespace template 201 may include plug-in value information 206, logic information 208, and environmental information 218. The plug-in value information 206 may include plug-in values that are received as input (e.g., user) from the client machine 110 and populated (e.g., plugged-in) into the tablespace template 201. The logic information 208 includes logic for execution to restore and recover the tablespace 132 in the database 118 on the source host 106, logic to perform other tasks, and logic to perform the like. The environmental information 218 may include configurable variables that are utilized by the logic information 208. For example, the environmental information 218 may include a service identifier identifying a type of service being provided by the native database recovery environment 105, one or more network entity identifiers in the form of universal resource locators (URLs) for identifying network entities, and the like. For example, the URLs may identify the location of network entities including binaries, library routines, text files, and the like.

The plug-in value information 206 may include a point-in-time 212, a source host identifier 223 identifying the source host 106, a database name 216 identifying the database 118, and a tablespace identifier 221 identifying the tablespace 132 in the database 118. The point-in-time 212 includes a date and a time (e.g., date-time) to recover the tablespace 132 in the database 118. For example, the user may request the tablespace 132 be recovered to the present time, two weeks prior to the present time, two years prior to the present time, or some other date-time. The source host identifier 223 includes one or more network addresses (e.g., URL) that uniquely identifies the source node 114 (e.g., PRIMARY) in the networked system 102. The database name 216 identifies the database 118 including the tablespace 132 for export to the source host 106. According to an embodiment, the logic information 208 may comprise commands (e.g., Recovery Manager, "RMAN" commands by Oracle) (e.g., SQL commands) that are created in a Jinja application environment that processes Jinja files to create layout files. In addition, the logic information 208 may comprise bash file script.

FIG. 2C is a block diagram illustrating processing 220, according to an embodiment, for materializing the file information 142. The processing 220 to materialize the file information 142 may be performed in the foreign database recovery environment 103 on the backup node 124 by the job module 204. The processing 220 to materialize the file information 142 includes a materializing set 225. The materializing set 225 includes a foreign snapshot file 226 and foreign incremental files 228. The materializing set 225 is utilized to materialize 222 the file information 142 in the foreign database recovery environment 103 that, in turn, is utilized to restore and recover the tablespace 132 in the database 118 on the source host 106. The foreign snapshot file 226 includes an image of the file information 142, and the foreign incremental files 228 include changes to the image of the file information 142. For example, the changes may include transactions "TX1"-"TX N," each being timestamped. The transactions are applied to the image of the file information 142, in the foreign database recovery environment 103, to recover the file information 142 to the identified date-time. In another example, the changes may include write operations that are applied to the image of the file information 142. The write operations may be timestamped. Other materializing sets 225 may include other combinations of the foreign snapshot file 226 and the foreign incremental files 228. For example, other materializing sets 225 may include the foreign snapshot file 226 and zero or more foreign incremental files 228.

The materializing sets 225 are stored in the database 128 in the foreign database recovery environment 103 to back up the database 118 in the native database recovery environment 105. For example, the materializing sets 225 may be stored in the database 128 responsive to the backup node 124 receiving snapshots of the database 118 being communicated from the backup agent 210, at the source node 114. Further for example, the materializing sets 225 may be stored in the database 128 responsive to the backup node 124 receiving updates to the database 118 being communicated from the backup agent 210, at the source node 114.

The materializing set 225 may be selected, at the backup host 104 by the job module 204, based on the point-in-time 212 that is received as export information in the form of input (e.g., selected by a user). For example, responsive to receiving the point-in-time 212 Sunday—Dec. 29, 2019 at 1:00 PM, the job module 204 may select the materializing set 225 from multiple materializing sets based on the point-in-time 212. Further, the job module 204 may identify a set of transactions from the materializing set 225 for application to the image in the foreign snapshot file 226. For example, the job module 204 may identify the set of transactions for inclusion in the materializing set 225 before the timestamp in transaction "TX5" because each of the transactions is timestamped before Sunday —Dec. 29, 2019 at 1:00 PM (e.g., the point-in-time 212). Conversely, the transactions "TX5"-"TX N" are not selected because the respective timestamps for each of the transactions is after Sunday— Dec. 29, 2019 at 1:00 PM (e.g., the point-in-time 212). Accordingly, the point-in-time 212 may be utilized by the job module 204 to identify the foreign snapshot file 226 and the foreign incremental files 228 that are included in the materializing set 225. In addition, the point-in-time 212 may be utilized by the job module 204 to identify the set of changes (e.g., transactions) in an incremental file 228 that are included in the materializing set 225.

The materializing set 225 may be utilized by a foreign database recovery process to materialize the file information 142 in the foreign database recovery environment 103. For example, the foreign database recovery process may include the job module 204 materializing the file information 142 in the foreign database recovery environment 103. The file information 142 may include the native snapshot file(s) 230, native incremental file(s) 232, and a native control file 234. The native snapshot files 230 include images of the database 118 and the native incremental files 232 include changes to the images of the database 118 at or before the point-in-time.

For example, the native incremental files 232 may include transactions "TX A"-"TX I." The transactions "TX A"-"TX I" may be timestamped. The transactions may be applied to the images of the database 118 in the native snapshot file(s) 230. The native control file 234 may include control information including the database name, names and locations of the associated files (e.g., native snapshot file(s) 230, native incremental file(s) 232), a timestamp chronicling the creation of the database 118, a current sequence number of the most recent change (e.g., transaction), and the like. Other embodiments may not include the control information in the native control file 234. The file information 142 may include different combinations of the native snapshot file(s) 230, the native incremental file(s) 232, and the native control file(s) 234. For example, the file information 142 may include the native snapshot file(s) 230 and the native control file 234 with zero or more native incremental files 232.

FIG. 2D is a block diagram illustrating processing 240, according to an embodiment, to communicate via the directories 130. The one or more directories 130 may be created by the job module 204 on the backup node 124 (e.g., PRIMARY) in the backup host 104 and on the source node 114 (e.g., PRIMARY) in the source host 106. Each directory 130 on the backup node 124 (e.g., PRIMARY) corresponds to a directory 130 on the source node 114 (e.g., PRIMARY). Each directory 130 may be utilized as a channel for communicating the file information 142 or the script information 140 from the backup node 124 to the source node 114. For example, files that are located in a first directory on the backup node 124 are communicated to the corresponding first directory on the source node 114. According to one embodiment, the number of directories 130 utilized may be configured in multiples of four. For example, the number of directories 130 shared between the backup node 124 (e.g., PRIMARY) and the source node 114 (e.g., PRIMARY) may be four, eight, twelve, and so forth. The script information 140 may be communicated in a directory 130 that is independent of the multiples of four. According to one embodiment, the file information 142 and the script information 140 may be communicated, via the directories 130, utilizing the Network Files System (NFS) protocol. The NFS protocol is one of several distributed file system standards for network-attached storage. NFS is a distributed file system protocol that enables a user on a client computer to access files over a computer network as local storage is accessed. NFS builds on the Open Network Computing Remote Procedure Call (ONC RPC) system.

Figure 2E:
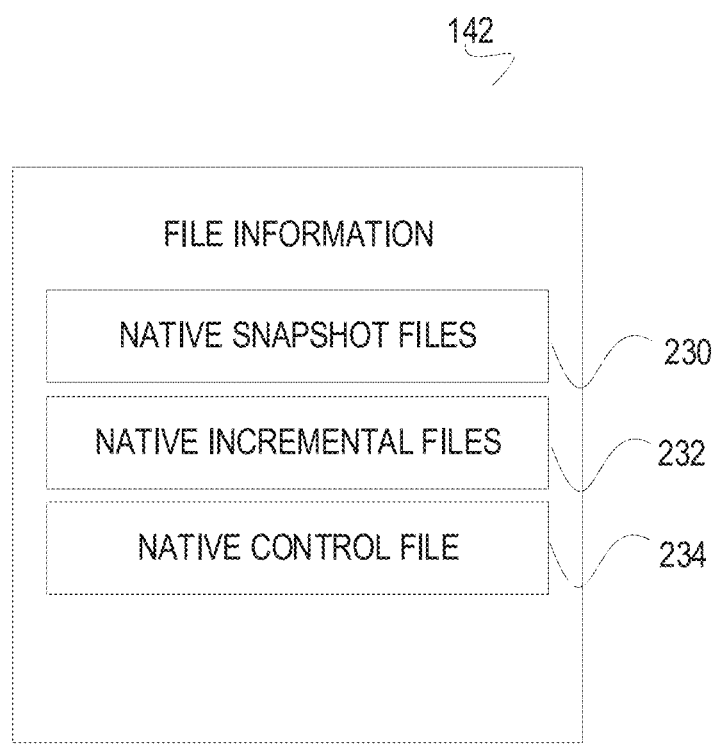
FIG. 2E is a block diagram illustrating file information, according to an embodiment.

FIG. 2E is a block diagram illustrating the file information 142, according to an embodiment. The file information 142 may include the native snapshot file(s) 230, the native incremental file(s) 232, and the native control file 234, as previously described.

FIG. 3A is a block diagram illustrating a method 300, according to an embodiment, for exporting the tablespace 132 from the foreign database recovery environment 103 and to the native database recovery environment 105. On the left are operations performed by the client machine 110; in the middle are operations performed in the foreign database recovery environment 103 by the backup host 104; and on the right are operations performed in the native database recovery environment 105 by the source host 106. The method 300 commences, at the source host 106, with the backup agent 210 communicating the database 118 to the backup host 104, at operation 302. For example, the backup agent 210 may communicate an image of the database 118 to the backup host 104 or a change to the image (e.g., transaction) to the database 118 to the backup host 104.

At operation 304, in the foreign database recovery environment 103, the backup host 104 may receive the image of the database 118 or the change to the image of the database 118 from the source host 106. For example, the receiving module 202, at the backup host 104, may receive and store the image or the change to the image or other information (e.g., metadata) in the database 128.

At operation 306, the client machine 110 receives export information from a user and communicates the export information to the backup host 104. For example, the export information may include a request to export the tablespace 132 identified with the tablespace identifier 221 in the database 118 identified with the database name 216 (e.g., XYZ DATABASE), the point-in-time 212 (E.G., Dec. 23, 2019—9:35:17 PM), and the source host 106 (e.g., SKY-WALKER) identified by the source host identifier 223. The point-in-time 212 identifies the date-time of the tablespace 132 in the database 118 for export to the source host 106. For example, the current date-time identifies the current tablespace 132 in the database 118 is to be exported to the source host 106. Further for example, a date-time before the current date-time identifies an earlier version of the tablespace 132 in the database 118 for export to the source host 106.

At operation 308, in the foreign database recovery environment 103, at the backup host 104, the receiving module 202 receives the export information. For example, the export information may be received over the network at the backup host 104 requesting the identified tablespace 132 in the database 118 be exported to the source host 106. The export information may further include the point-in-time 212, the source host identifier 223 identifying the source host 106, the database name 216 identifying the database 118, and the tablespace identifier 221 identifying the tablespace 132 in the database 118 for export to the source host 106, according to an embodiment.

At operation 310, the receiving module 202 initiates the job module 204 based on the export information and responsive to receipt of the export information. For example, the receiving module 202 may initiate one or more jobs that execute serially or in parallel to export the tablespace 132 in the database 118 that was identified with the tablespace identifier 221.

At operation 312, the job module 204 generates the script information 140. For example, the job module 204 may select the tablespace template 201 from the template information 200 based on the export information, populate the plug-in value information 206 in the tablespace template 201 based on the export information, and populate the environmental information 218 based on the export information. The script information 140 may include one or more scripts including the logic information 208 comprising commands that execute on the source node 114 (e.g., PRIMARY) in the source host 106 to export the tablespace 132 in the database 118 to the source host 106.

At operation 314, the job module 204 creates directories 130 on the backup host 104 and on the source host 106. For example, the job module 204 may create the directories 130 as illustrated and described in FIG. 2D. Returning to FIG. 3A, the number of directories (e.g., 4, 8, 12, etc.) created on the backup host 104 and the source host 106 may be inherited from configuration information on the source host 106, according to an embodiment. If, for example, the source host 106 includes configuration information that is configured to utilize eight directories, then the job module 204 creates eight directories on the backup host 104 and the source host 106.

At operation 316, the job module 204 materializes the file information 142. For example, at the backup node 124, the job module 204 may select a materializing set 225 based on the export information (e.g., point-in-time 212, tablespace 132, source host 106, and the like) and materialize the file information 142, as illustrated and described in FIG. 2C.

Returning to FIG. 3A, at operation 318, the job module 204 communicates the file information 142 and the script information 140, via the directories 130, over the network 112 to the source host 106. For example, each of the directories 130 may be utilized as a channel for communicating the file information 142 and the script information 140 to the source host 106. According to an embodiment, the communication of the file information 142 may be load balanced, via the directories 130, based on the size of the files. According to an embodiment, the directories 130 may be Oracle Recovery Manager (RMAN) channels where each channel represents one stream of data and corresponds to one server session. According to this embodiment, each channel (directory 130) is utilized to establish a connection from the backup node 124 (e.g., client) to the database 118 instance on the source host 106 (e.g., PRIMARY) by starting a server session on the database 118 instance on the source node 114 (e.g., PRIMARY). According to an embodiment, the network file system protocol (NFS) may be utilized to communicate the file information 142.

At operation 320, the tablespace 132 in the the database 118 is exported to the source host 106 in the native database recovery environment 105. For example, the source node 114 (e.g., PRIMARY) in the source host 106 may receive the file information 142 and the script information 140, via the directories 130. The script information 140 includes scripts that are executed, on the source node 114, to restore and recover the identified tablespace 132 in the database 118 on the source node 114. The operation 320 is further described in association with FIG. 3B.

According to another embodiment, the operations included in the method 300 may be performed in the native database recovery environment 105 by the primary source node in a clustered database. For example, the source node 114 may communicate the file information 142 and the script information 140, via the directories 130, to each of the additional source nodes in the clustered database to export the tablespace 132 to the additional source nodes. This embodiment is further described in association with FIG. 5A.

Figure 3B:
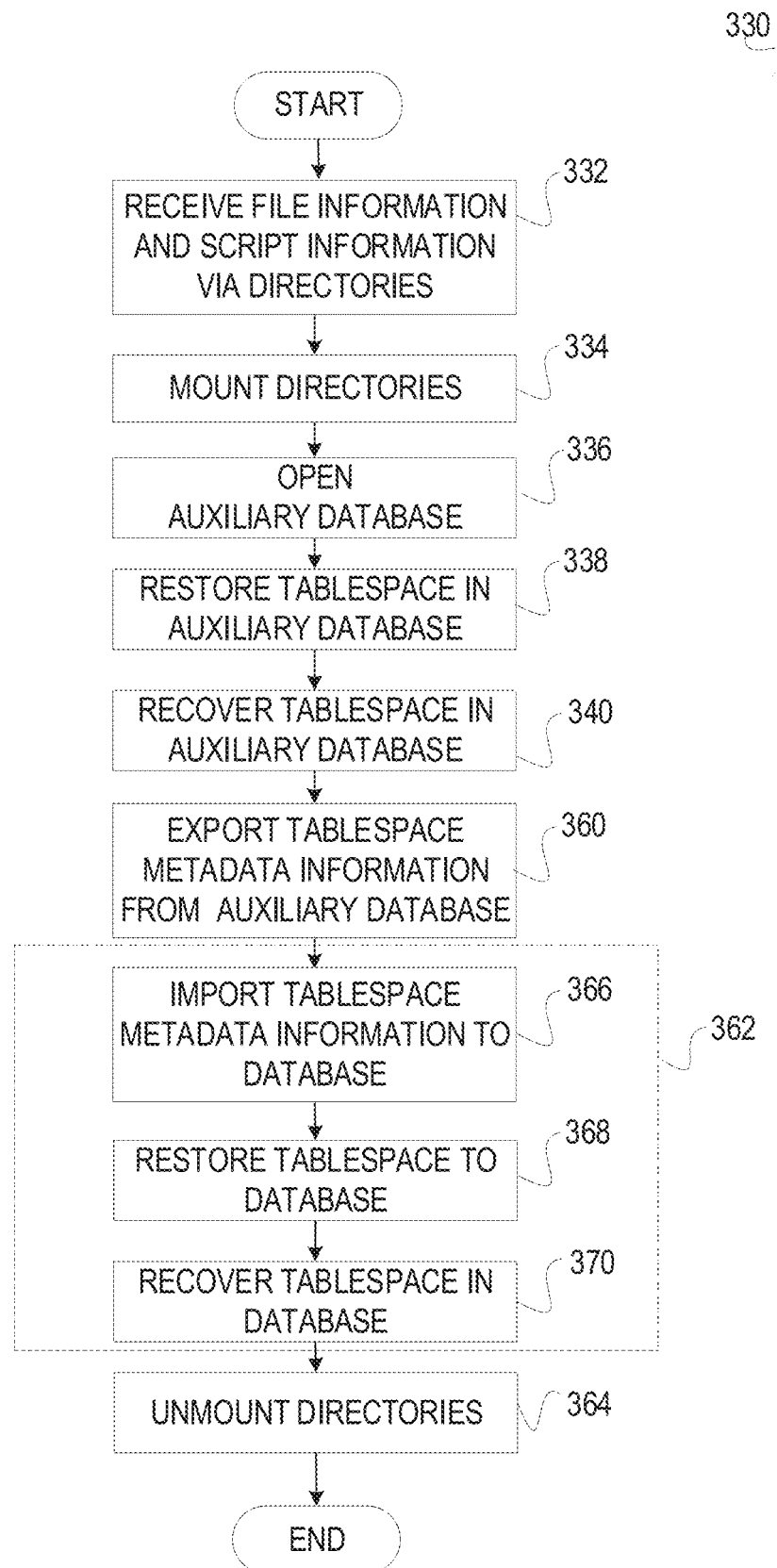
FIG. 3B is a block diagram illustrating a method, according to an embodiment, for exporting a tablespace to a native database recovery environment.

FIG. 3B is a block diagram illustrating a method 330, according to an embodiment, for utilizing the tablespace 132 to export to the native database recovery environment 105. The operations may be performed in the native database recovery environment 105 on the source host 106. The operations 332-364 are described with reference to the source host 106.

At operation 332, the file information 142 and the script information 140 are received, via the directories 130, at the source host 106. For example, the source node 114 (e.g., PRIMARY) may receive the file information 142, via one or more directories 130, as previously described in association with FIG. 2E. In addition, the source node 114 (e.g., PRIMARY) may receive the script information 140 via a directory 130 including a first directory, as previously described in association with FIG. 2D. Returning to FIG. 3, the file information 142 may include the native snapshot file(s) 230, zero or more native incremental file(s) 232, and the native control file 234. The script information 140 may include one or more scripts that are executed on the source node 114 to export the identified tablespace 132 in the database 118 to the source node 114, as described below in the operations 334-364.

At operation 334, at the source host 106 in the native database recovery environment 105, one or more scripts may execute to mount the directories 130. For example, the remote connector agent 211 on the source node 120 (e.g., PRIMARY) may identify a script and cause the script to execute to mount the directories 130 to the directory structure on the source node 114.

At operation 336, at the source host 106 in the native database recovery environment 105, one or more scripts may execute to open the auxiliary database 119. For example, the script may execute the SQL "STARTUP" command to mount and open the auxiliary database 119.

At operation 338, at the source host 106 in the native database recovery environment 105, one or more scripts may execute to restore the identified tablespace 132 in the database 118. For example, the one or more scripts may utilize one or more native snapshot file(s) 230 and one or more native control file(s) 234 in the file information 142 to restore the image of the identified tablespace 132 auxiliary database 119.

At operation 340, at the source host 106 in the native database recovery environment 105, one or more scripts may execute to recover the identified tablespace 132 in the auxiliary database 119. For example, the one or more scripts may utilize the one or more native incremental file(s) in the file information 142 to recover the identified tablespace 132 in the auxiliary database 119 by applying the incremental changes to the image of the identified tablespace 132 in the auxiliary database 119. According to an embodiment, the incremental changes may include transactions or write operations that change the image of the identified tablespace 132 in the auxiliary database 119.

At operation 360, at the source host 106 in the native database recovery environment 105, one or more scripts may execute to export the tablespace metadata information 148 for the identified tablespace 132 from the auxiliary database 119. For example, the one or more scripts may utilize one or more modules in the native database recovery environment 105 to export the tablespace metadata information 148 for the identified tablespace 132 from the auxiliary database 119.

At operation 362, at the source host 106 in the native database recovery environment 105, one or more scripts may execute to update the identified tablespace 132 in the database 118. For example, the operation 362 may include the operations 366, 368, and 370 to update the identified tablespace 132 in the database 118.

At operation 366, at the source host 106 in the native database recovery environment 105, one or more scripts may execute to import the tablespace metadata information 148 for the identified tablespace 132 to the database 118. For example, the one or more scripts may utilize one or more modules in the native database recovery environment 105 to import the tablespace metadata information 148 for the identified tablespace 132 to the database 118.

At operation 368, at the source host 106 in the native database recovery environment 105, one or more scripts may execute to restore the identified tablespace 132 in the database 118. For example, the one or more scripts may utilize one or more modules in the native database recovery environment 105 to restore the image of the identified tablespace 132 in the database 118. According to this embodiment, one or more modules in the native database recovery environment 105 may utilize the native snapshot files 230, received from the backup host 104 via the directories 130, to restore the image of the identified tablespace 132 in the database 118.

At operation 370, at the source host 106 in the native database recovery environment 105, one or more scripts may execute to recover the identified tablespace 132 in the database 118. For example, the one or more scripts may utilize one or more modules in the native database recovery environment 105 to recover the image of the identified tablespace 132 in the database 118. According to this embodiment, the one or more modules in the native database recovery environment 105 may utilize the native incremental files 232, received from the backup host 104 via the directories 130, to recover the image of the identified tablespace 132 in the database 118.

At operation 362, at the source host 106 in the native database recovery environment 105, one or more scripts may execute to unmount the directories 130. For example, the one or more scripts may unmount the directories 130 to make the directories 130 inaccessible and to detach the directories 130 from the directory structure on the source node 114.

According to another embodiment, the operations included in the method 330 may be performed in the native database recovery environment 105 by each of the additional source nodes in a clustered database. For example, each of the additional source nodes may receive the file information 142 and the script information 140, via the directories 130, from the source node 114 and process the file information 142 and the script information 140 to export the tablespace 132 to the additional source node. This embodiment is further described in association with FIG. 5B.

Figure 4A:
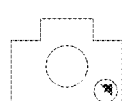
FIG. 4A is a block diagram illustrating an electronic user interface, according to an embodiment.

FIG. 4A is a block diagram illustrating an electronic user interface 400, according to an embodiment, for initializing export information. The electronic user interface 400 may initialize the export information including a request to identify a tablespace 132 in a database 118 based on point-in-time 212 and export the tablespace 132 to a source host 106. The user interface 400 is illustrated in the day view 402. Other user interfaces may present a year view for selecting a month in a specified year and/or a month view for selecting a day in a specified month. The electronic user interface 400 presents the date, "Jan. 21, 2020," a timeline 404 including dots each representing a foreign snapshot file 226 including the image of the database 118 (e.g., 12:00 AM, 6:00 AM, 12:00 PM, 6:00 PM) and zero or more foreign incremental files 228 including changes to the image of the database 118, an input box 406 for receiving the point-in-time 212 for identifying a date-time, as previously described, the database name 216 identifying the database 118, and rows of tablespace identifiers 221 each identifying a tablespace 132 in the database 118.

The electronic user interface 400 may initialize the export information responsive to receiving a selection identifying a dot corresponding to a point-in-time 212. For example, responsive to receiving a selection of a dot corresponding to the point-in-time 212 of Jan. 21, 2020, 5:19:35 AM, the export information may be initialized with the point-in-time 212 of Jan. 21, 2020, 5:19:35 AM. In addition, responsive to receiving a selection identifying the tablespace identifier 221 "TABLESPACE_2," the export information may be initialized with the database name 216 (e.g., "XYZ DATABASE 118") identifying the corresponding database 118 and the corresponding tablespace 132.

Figure 4B:
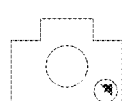
FIG. 4B is a block diagram illustrating an electronic user interface, according to an embodiment.

FIG. 4B is a block diagram illustrating an electronic user interface 420, according to an embodiment, for receiving export information. The user interface 420 corresponds to the user interface 400 in FIG. 4A; accordingly, the same or similar references have been used to indicate the same or similar features unless otherwise indicated. The user interface 420 further includes a recover button 408 for receiving the export information. For example, responsive to receiving a selection that selects the recover button 408, the job module 204 receives the export information including a request to export the "TABLESPACE_2" tablespace 132 to the XYZ DATABASE 118 at the source host 106 at the point-in-time 212 of Jan. 21, 2020, 5:19:35 AM.

FIG. 5A is a block diagram illustrating a system 500, according to an embodiment, to export a cluster database. The system 500 corresponds to the system 100 in FIG. 1A; accordingly, the same or similar references have been used to indicate the same or similar features unless otherwise indicated. The backup host 104 includes three backup nodes including a backup node 124, a backup node 504, and a backup node 506. Each of the backup nodes 124, 504, and 506 is communicatively coupled to a storage device that stores the database 128.

Accordingly, backup nodes 124, 504, and 506 are communicatively coupled to replicates of the database 128. The backup node 124 operates as the primary for the backup nodes 504, 506, and additional backup nodes.

The source host 106 includes three nodes including source nodes 114, 510, and 512. Each of the source nodes 114, 510, and 512 is communicatively coupled to a storage device that stores the database 118 and the auxiliary database 119. Accordingly, the source nodes 114, 510, and 512 are communicatively coupled to replicates of the database 118. The source node 114 operates as the primary for the source nodes 510, 512, and additional source nodes.

The system 500 operates as the system 100 in exporting the tablespace 132 that was identified from the backup node 124 (e.g., PRIMARY) to the source node 114 (e.g., PRIMARY). For example, the file information 142 and the script information 140 are communicated from the backup node 124 to the source node 114, via the directories 130, in substantially the same manner. The system 500 further includes the source node 114 (e.g., PRIMARY) restoring and recovering the tablespace 132 on each of the additional source nodes including the source node 510 and the source node 512. According to one embodiment, the backup host 104 may be embodied as a Rubrik host with a Cassandra clustered database and the source host 106 may be embodied as an Oracle host with a Real Application clustered (RAC) database.

Figure 5B:
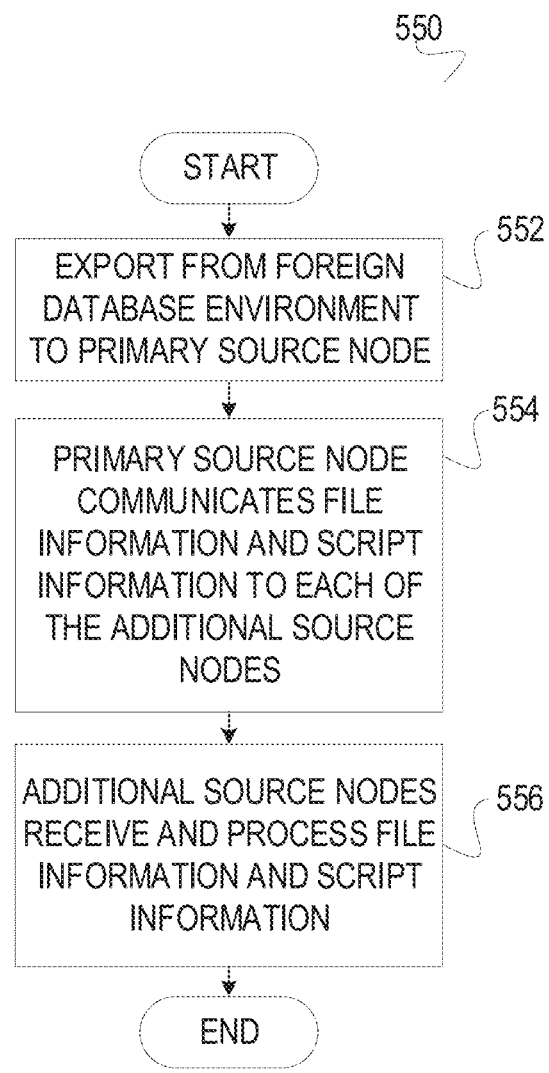
FIG. 5B is a block diagram illustrating a method, according to an embodiment, to export a tablespace to a native database recovery environment utilizing a cluster database.

FIG. 5B is a block diagram illustrating a method 550, according to an embodiment, to export a tablespace to a native database recovery environment utilizing a cluster database. The method 550 commences at operation 552, at the backup host 104, with the backup node 124 (e.g., PRIMARY) exporting the tablespace 132 from the foreign database recovery environment 103 to the native database recovery environment 105. For example, the tablespace 132 may have been identified utilizing the electronic user interfaces 400 illustrated in FIG. 4A and the electronic user interfaces 420 illustrated in FIG. 4B and exported from the backup node 124 (e.g., PRIMARY), in the foreign database recovery environment 103, to the source node 114 (e.g., PRIMARY), in the native database recovery environment 105, as described in the method 300 and illustrated in FIG. 3A.

At operation 554, the source node 114 communicates the file information 142 and the script information 140, via the directories 130, to each of the additional source nodes. For example, the source node 114 may communicate the file information 142 and the script information 140 to the source node 510 and the source node 512 by creating and utilizing the directories 130 as illustrated in FIG. 2D.

At operation 556, each of the additional source nodes receives the file information 142 and the script information 140 from the source node that is primary and processes the file information 142 and the script information 140 to export the tablespace 132 to the additional source nodes. For example, the source node 510 and the source node 512 receive the file information 142 and the script information 140 from the source node 114 (e.g., PRIMARY) and the source node 510, and the source node 512 processes the file information 142 and the script information 140 to export the tablespace 132 into the native database recovery environment 105, at the source node 510 and the source node 512. According to an embodiment, the source node 510 and the source node 512 receive and process the file information 142 and the script information 140 to export the tablespace 132 to the native database recovery environment 105, as described in method 330, illustrated in FIG. 3B.

FIG. 6A is a block diagram illustrating a system 600, according to an embodiment, for optimizing utilization of a tablespace for export from the foreign database recovery environment 103. The system 600 corresponds to the system 100 in FIG. 1A; accordingly, the same or similar references have been used to indicate the same or similar features unless otherwise indicated. The system 600 differs from the system 100 because the tablespace metadata information 148 is generated at the backup host 104 rather than the source host 106. According to this embodiment, an optimization is realized at the source host 106 because the source host 106 no longer utilizes processing or storage resources to generate the tablespace metadata information 148. Accordingly, the backup node 124 (e.g., PRIMARY) creates the auxiliary database 119, restores the tablespace 132 in the auxiliary database 119 based on the file information 142, recovers the tablespace 132 in the auxiliary database 119 based on the file information 142, and generates the tablespace metadata information 148 by processing the tablespace 132 in the auxiliary database 119. In addition, the backup node 124 may utilize the directories 130 to communicate the tablespace metadata information 148 to the source node 114 (e.g., PRIMARY).

Figure 6B:
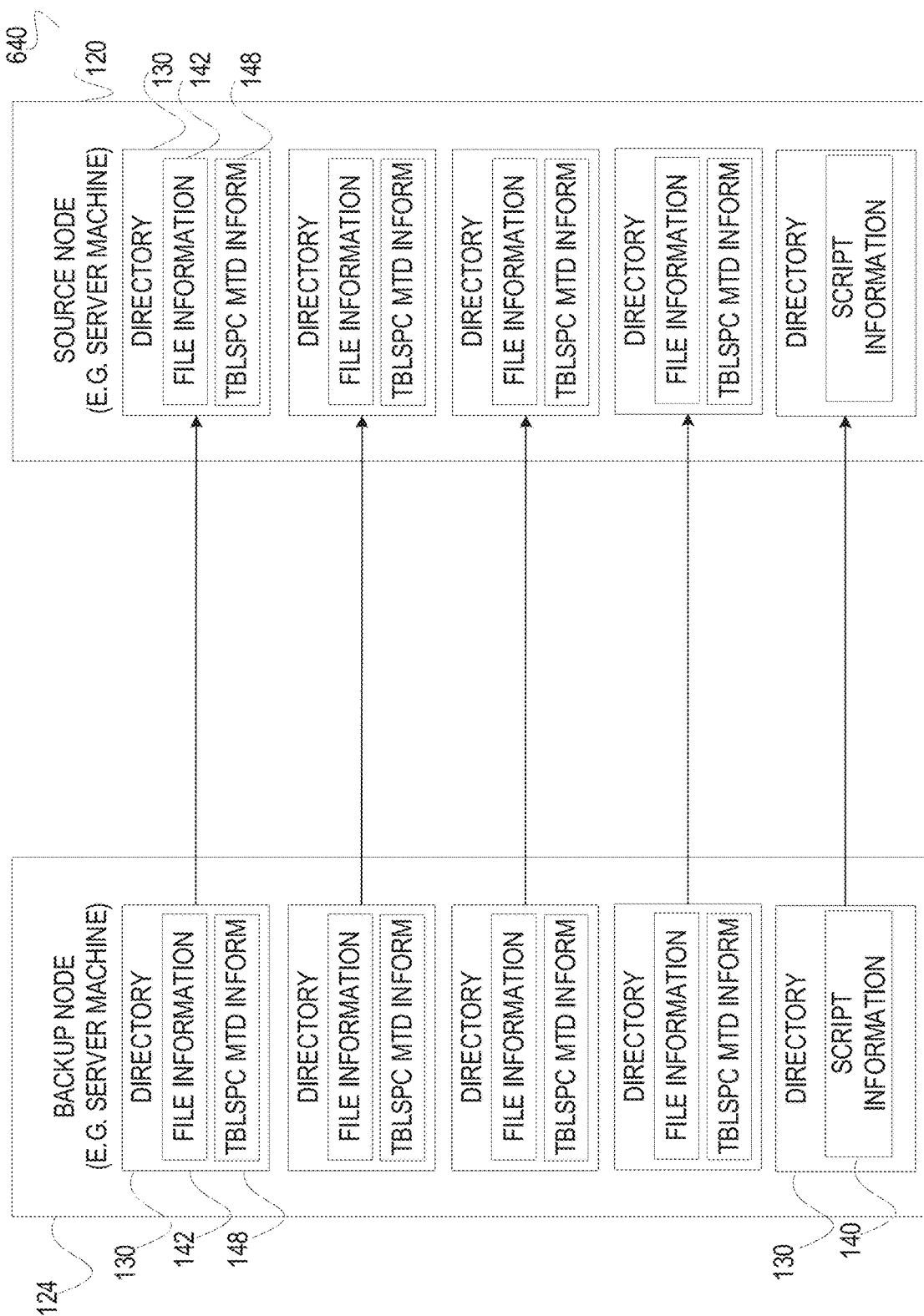
FIG. 6B is a block diagram illustrating processing, according to an embodiment, to communicate via the directories.

FIG. 6B is a block diagram illustrating processing 640, according to an embodiment, to communicate via the directories 130. The processing 640 corresponds to the processing 240 in FIG. 2D; accordingly, the same or similar references have been used to indicate the same or similar features unless otherwise indicated. The processing 640 differs from the processing 240 because the backup host 104 utilizes the directories 130 to communicate the tablespace metadata information 148 to the source host 106. For example, the backup node (e.g., PRIMARY) may communicate the tablespace metadata information 148, via the directories 130, to the source node 120 (e.g., PRIMARY). In addition, the backup node (e.g., PRIMARY) also communicates the file information 142 and the script information 140, via the directories 130, to the source node 120 (e.g., PRIMARY) as previously described and illustrated in FIG. 6B.

FIG. 6C is a block diagram illustrating a method 660, according to an embodiment, for optimizing utilization of a tablespace for export from a foreign database recovery environment. The method 660 corresponds to the method 300 in FIG. 3A; accordingly, the same or similar references have been used to indicate the same or similar features unless otherwise indicated. The method 660 includes the operations 302-316, as previously described in in FIG. 3A.

At operation 662, the job module 204 at the backup host 104 creates an auxiliary database 119 and utilizes the auxiliary database 119 to generate the tablespace metadata information 148 associated with the tablespace 132 that was selected. The operation 662 includes the operations 338, 340, and 360, as previously described; however, the job module 204, rather than the source host 106, executes these operations. For example, the job module 204 may open/create the auxiliary database 119, restore the tablespace 132 in the auxiliary database 119 by utilizing the native snapshot files 230 included in the file information 142 that was materialized, recover the tablespace 132 in the auxiliary database 119 by utilizing the native snapshot files 230 included in the file information 142 that was materialized, and export the tablespace metadata information 148 from the auxiliary database 119. According to an embodiment, the job module 204 may invoke one or more utility modules that execute in the native database recovery environment 105 to open/create the auxiliary database 119, restore the tablespace 132, recover the tablespace 132, and export the tablespace metadata information 148 from the auxiliary database 119.

At operation 664, the job module 204 communicates the file information 142 and the script information 140 and the tablespace metadata information 148, via the directories 130, over the network 112 to the source host 106. For example, each of the directories 130 may be utilized as a channel for communicating the file information 142 and the script information 140 and the tablespace metadata information 148 to the source host 106. According to an embodiment, the communication of the file information 142 may be load balanced, via the directories 130, based on the size of the files. According to an embodiment, the directories 130 may be Oracle Recovery Manager (RMAN) channels where each channel represents one stream of data and corresponds to one server session. According to this embodiment, each channel (directory 130) is utilized to establish a connection from the backup node 124 (e.g., client) to the database 118 instance on the source host 106 (e.g., PRIMARY) by starting a server session on the database 118 instance on the source node 114 (e.g., PRIMARY). According to an embodiment, the network file system protocol (NFS) may be utilized to communicate the file information 142.

At operation 667, the tablespace 132 in the database 118 is exported to the source host 106 in the native database recovery environment 105. For example, the source node 114 (e.g., PRIMARY) in the source host 106 may receive the file information 142 and the script information 140 and the tablespace metadata information 148, via the directories 130. The script information 140 includes one or more scripts that are executed, on the source node 114, to import the tablespace metadata information 148 into the database 118, restore the tablespace 132 in the database 118 by utilizing the native snapshot files 230 included in the file information 142 received via the directories 130, recover the tablespace 132 in the database 118 by utilizing the native snapshot files 230 included in the file information 142 that was received via the directories 130.

According to an embodiment, the one or more scripts may invoke one or more utility modules that execute in the native database recovery environment 105 to open/create the auxiliary database 119, restore the tablespace 132, recover the tablespace 132, and export the tablespace metadata information 148 from the auxiliary database 119.

According to another embodiment, the operations included in the operation 667 may be performed in the native database recovery environment 105 by the primary source node in a clustered database. For example, the source node 114 may communicate the file information 142 and the script information 140 and the tablespace metadata information 148, via the directories 130, to each of the additional source nodes in the clustered database to export the tablespace 132 to the additional source nodes.

Figure 7A:
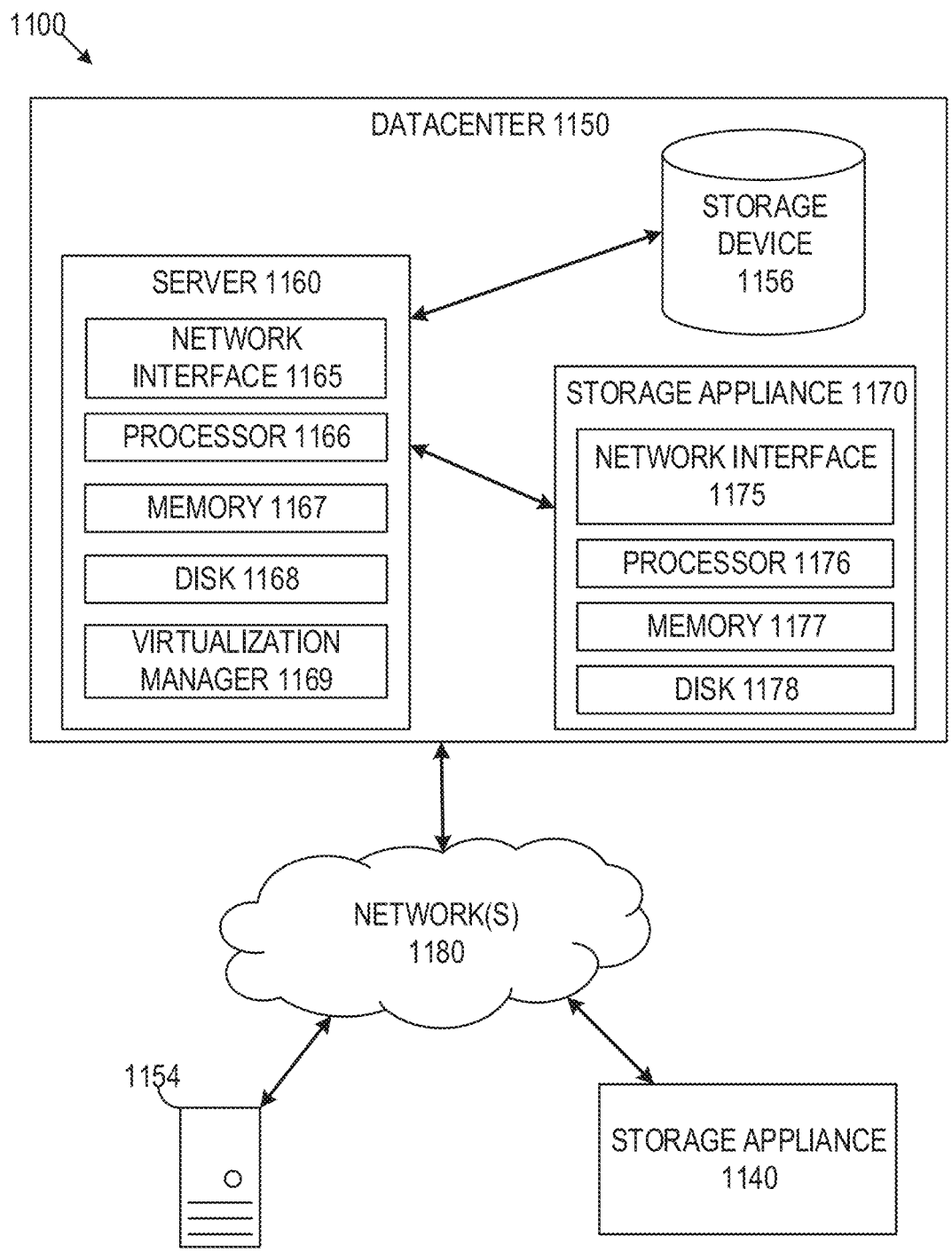
FIG. 7A is a block diagram illustrating a networked computing environment, according to an embodiment.

FIG. 7A depicts one embodiment of a networked computing environment 1100 in which the disclosed technology may be practiced. As depicted, the networked computing environment 1100 includes a data center 1150, a storage appliance 1140, and a computing device 1154 in communication with each other via one or more networks 1180. The networked computing environment 1100 may include a plurality of computing devices interconnected through one or more networks 1180. The one or more networks 1180 may allow computing devices and/or storage devices to connect to and communicate with other computing devices and/or other storage devices. In some cases, the networked computing environment 1100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The data center 1150 may include one or more servers, such as server 1160, in communication with one or more storage devices, such as storage device 1156. The one or more servers 1160 may also be in communication with one or more storage appliances, such as storage appliance 1170. The server 1160, storage device 1156, and storage appliance 1170 may be in communication with each other via a networking fabric connecting servers and data storage units within the data center 1150 to each other. The storage appliance 1170 may include a data management system for backing up virtual machines and/or files within a virtualized infrastructure. The server 1160 may be used to create and manage one or more virtual machines associated with a virtualized infrastructure.

The one or more virtual machines may run various applications, such as a database application or a web server. The storage device 1156 may include one or more hardware storage devices for storing data, such as a hard disk drive (HDD), a magnetic tape drive, a solid-state drive (SDS), a storage area network (SAN) storage device, or a networked-attached storage (NAS) device. In some cases, a data center, such as data center 1150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 1180 may include a secure network such as an enterprise private network, an unsecure network such as a wireless open network, a local area network (LAN), a wide area network (WAN), and the Internet. The one or more networks 1180 may include a cellular network, a mobile network, a wireless network, or a wired network. Each network of the one or more networks 1180 may include hubs, bridges, routers, switches, and wired transmission media such as a direct-wired connection. The one or more networks 1180 may include an extranet or other private network for securely sharing information or providing controlled access to applications or files.

A server, such as server 1160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 1160 includes a network interface 1165, processor 1166, memory 1167, disk 1168, and virtualization manager 1169 all in communication with each other. Network interface 1165 allows server 1160 to connect to one or more networks 1180. Network interface 1165 may include a wireless network interface and/or a wired network interface. Processor 1166 allows server 1160 to execute computer-readable instructions stored in memory 1167 in order to perform processes described herein. Processor 1166 may include one or more processing units, such as one or more CPUs and/or one or more GPUs.

Memory 1167 may comprise one or more types of memory (e.g., RAM, SRAM, DRAM, ROM, EEPROM, Flash, etc.). Disk 1168 may include a hard disk drive and/or a solid-state drive. Memory 1167 and disk 1168 may comprise hardware storage devices.

The virtualization manager 1169 may manage a virtualized infrastructure and perform management operations associated with the virtualized infrastructure. The virtualization manager 1169 may manage the provisioning of virtual machines running within the virtualized infrastructure and provide an interface to computing devices interacting with the virtualized infrastructure. In one example, the virtualization manager 1169 may set a virtual machine into a frozen state in response to a snapshot request made via an application programming interface (API) by a storage appliance, such as storage appliance 1170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 1169 may then transfer data associated with the virtual machine (e.g., an image of the virtual machine or a portion of the image of the virtual disk file associated with the state of the virtual disk at the point-in-time from which it is frozen) to a storage appliance in response to a request made by the storage appliance. After the data associated with the point-in-time snapshot of the virtual machine has been transferred to the storage appliance 1170, the virtual machine may be released from the frozen state (i.e., unfrozen) and the updates made to the virtual machine and stored in the separate file may be merged into the virtual disk file. The virtualization manager 1169 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 1170 includes a network interface 1175, processor 1176, memory 1177, and disk 1178 all in communication with each other. Network interface 1175 allows storage appliance 1170 to connect to one or more networks 1180. Network interface 1175 may include a wireless network interface and/or a wired network interface. Processor 1176 allows storage appliance 1170 to execute instructions stored in memory 1177 in order to perform processes described herein. Processor 1176 may include one or more processing units, such as one or more CPUs and/or one or more GPUs. Memory 1177 may comprise one or more types of memory (e.g., RAM, SRAM, DRAM, ROM, EEPROM, NOR Flash, NAND Flash, etc.). Disk 1178 may include a hard disk drive and/or a solid-state drive. Memory 1177 and disk 1178 may comprise hardware storage devices.

In one embodiment, the storage appliance 1170 may include four machines. Each of the four machines may include a multi-core CPU, 64 GB of RAM, a 400 GB SDS, three 4 TB HDDs, and a network interface controller. In this case, the four machines may be in communication with the one or more networks 1180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of a thousand virtual machines. The networked computing environment 1100 may provide a cloud computing environment for one or more computing devices. Cloud computing may refer to Internet-based computing, wherein shared resources, software, and/or information may be provided to one or more computing devices on-demand via the Internet. The networked computing environment 1100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 1100 may include a virtualized infrastructure that provides software, data processing, and/or data storage services to end users accessing the services via the networked computing environment 1100. In one example, networked computing environment 1100 may provide cloud-based work productivity or business-related applications to a computing device, such as computing device 1154. The storage appliance 1140 may comprise a cloud-based data management system for backing up virtual machines and/or files within a virtualized infrastructure, such as virtual machines running on server 1160 or files stored on server 1160.

In some cases, networked computing environment 1100 may provide remote access to secure applications and files stored within data center 1150 from a remote computing device, such as computing device 1154. The data center 1150 may use an access control application to manage remote access to protected resources, such as protected applications, databases, or files located within the data center 1150. To facilitate remote access to secure applications and files, a secure network connection may be established using a virtual private network (VPN). A VPN connection may allow a remote computing device, such as computing device 1154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 1170 may manage the extraction and storage of virtual machine snapshots associated with different point-in-time versions of one or more virtual machines running within the data center 1150. A snapshot of a virtual machine may correspond with a state of the virtual machine at a particular point-in-time. In response to a restore command from the server 1160, the storage appliance 1170 may restore a point-in-time version of a virtual machine or restore point-in-time versions of one or more files located on the virtual machine and transmit the restored data to the server 1160. In response to a mount command from the server 1160, the storage appliance 1170 may allow a point-in-time version of a virtual machine to be mounted and allow the server 1160 to read and/or modify data associated with the point-in-time version of the virtual machine. To improve storage density, the storage appliance 1170 may deduplicate and compress data associated with different versions of a virtual machine and/or deduplicate and compress data associated with different virtual machines. To improve system performance, the storage appliance 1170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 1170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point-in-time. Each snapshot may correspond with a different version of the virtual machine (e.g., Version 1 of a virtual machine may correspond with the state of the virtual machine at a first point-in-time and Version 2 of the virtual machine may correspond with the state of the virtual machine at a second point-in-time subsequent to the first point-in-time).

The user interface may enable an end user of the storage appliance 1170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 1170 may run a NFS server and make the particular version (or a copy of the particular version) of the virtual machine accessible for reading and/or writing. The end user of the storage appliance 1170 may then select the particular version to be mounted and run an application (e.g., a data analytics application) using the mounted version of the virtual machine. In another example, the particular version may be mounted as an iSCSI target.

According to an embodiment, the storage appliance 1140 may be embodied as the source node 114. In this embodiment, multiple storage appliances 1140 may be clustered together to form a clustered database. For example, an Oracle host with a RAC cluster may be embodied in multiple storage appliances 1140. According to an embodiment, the storage appliance 1140 may be embodied as the source node 114. In this embodiment, multiple storage appliances 1140 may be clustered together to form a clustered database. For example, an Oracle host with a RAC cluster may be embodied in multiple storage appliances 1140. According to an embodiment, the storage appliance 1170 may be embodied as the backup node 124. In this embodiment, multiple storage appliances 1170 may be clustered together to form a clustered database, as previously described.

Figure 7B:
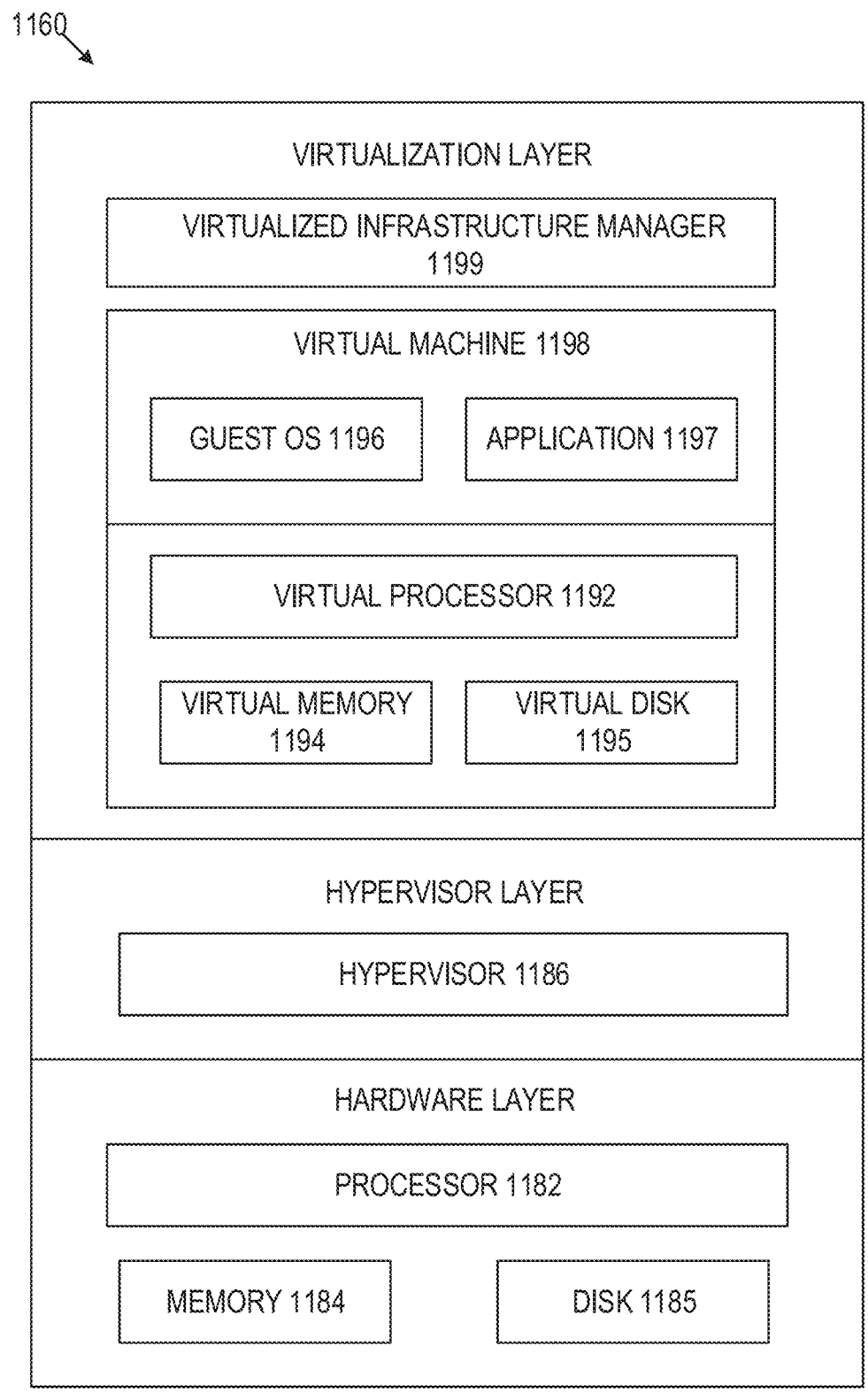
FIG. 7B is a block diagram illustrating a server, according to an embodiment.

FIG. 7B depicts one embodiment of server 1160 in FIG. 7A. The server 1160 may comprise one server out of a plurality of servers that are networked together within a data center (e.g., data center 1150). In one example, the plurality of servers may be positioned within one or more server racks within the data center. As depicted, the server 1160 includes hardware-level components and software-level components. The hardware-level components include one or more processors 1182, one or more memory 1184, and one or more disks 1185. The software-level components include a hypervisor 1186, a virtualized infrastructure manager 1199, and one or more virtual machines, such as virtual machine 1198. The hypervisor 1186 may comprise a native hypervisor or a hosted hypervisor. The hypervisor 1186 may provide a virtual operating platform for running one or more virtual machines, such as virtual machine 1198. Virtual machine 1198 includes a plurality of virtual hardware devices including a virtual processor 1192, a virtual memory 1194, and a virtual disk 1195. The virtual disk 1195 may comprise a file stored within the one or more disks 1185. In one example, a virtual machine 1198 may include a plurality of virtual disks, with each virtual disk of the plurality of virtual disks associated with a different file stored on the one or more disks 1185. Virtual machine 1198 may include a guest operating system 1196 that runs one or more applications, such as application 1197.

The virtualized infrastructure manager 1199, which may correspond with the virtualization manager 1169 in FIG. 7A, may run on a virtual machine or natively on the server 1160. The virtualized infrastructure manager 1199 may provide a centralized platform for managing a virtualized infrastructure that includes a plurality of virtual machines. The virtualized infrastructure manager 1199 may manage the provisioning of virtual machines running within the virtualized infrastructure and provide an interface to computing devices interacting with the virtualized infrastructure. The virtualized infrastructure manager 1199 may perform various virtualized infrastructure-related tasks, such as cloning virtual machines, creating new virtual machines, monitoring the state of virtual machines, and facilitating backups of virtual machines.

In one embodiment, the server 1160 may use the virtualized infrastructure manager 1199 to facilitate backups for a plurality of virtual machines (e.g., eight different virtual machines) running on the server 1160. Each virtual machine running on the server 1160 may run its own guest operating system and its own set of applications. Each virtual machine running on the server 1160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 1140 in FIG. 7A or storage appliance 1170 in FIG. 7A, may request a snapshot of a virtual machine running on the server 1160. The snapshot of the virtual machine may be stored as one or more files, with each file associated with a virtual disk of the virtual machine. A snapshot of a virtual machine may correspond with a state of the virtual machine at a particular point-in-time. The particular point-in-time may be associated with a time stamp. In one example, a first snapshot of a virtual machine may correspond with a first state of the virtual machine (including the state of applications and files stored on the virtual machine) at a first point-in-time and a second snapshot of the virtual machine may correspond with a second state of the virtual machine at a second point-in-time subsequent to the first point-in-time.

In response to a request for a snapshot of a virtual machine at a particular point-in-time, the virtualized infrastructure manager 1199 may set the virtual machine into a frozen state or store a copy of the virtual machine at the particular point-in-time. The virtualized infrastructure manager 1199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point-in-time and a virtual machine configuration file storing configuration settings for the virtual machine at the particular point-in-time. The contents of the virtual disk file may include the operating system used by the virtual machine, local applications stored on the virtual disk, and user files (e.g., images and word processing documents). In some cases, the virtualized infrastructure manager 1199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 1199 may transfer a portion of an image of the virtual machine associated with data that has changed since an earlier point-in-time prior to the particular point-in-time or since a last snapshot of the virtual machine was taken. In one example, the virtualized infrastructure manager 1199 may transfer only data associated with virtual blocks stored on a virtual disk of the virtual machine that have changed since the last snapshot of the virtual machine was taken. In one embodiment, the data management application may specify a first point-in-time and a second point-in-time and the virtualized infrastructure manager 1199 may output one or more virtual data blocks associated with the virtual machine that have been modified between the first point-in-time and the second point-in-time.

In some embodiments, the server 1160 or the hypervisor 1186 may communicate with a storage appliance, such as storage appliance 1140 in FIG. 7A or storage appliance 1170 in FIG. 7A, using a distributed file system protocol such as NFS Version 3. The distributed file system protocol may allow the server 1160 or the hypervisor 1186 to access, read, write, or modify files stored on the storage appliance 1140/1170 as if the files were locally stored on the server 1160. The distributed file system protocol may allow the server 1160 or the hypervisor 1186 to mount a directory or a portion of a file system located within the storage appliance 1140/1170.

Figure 7C:
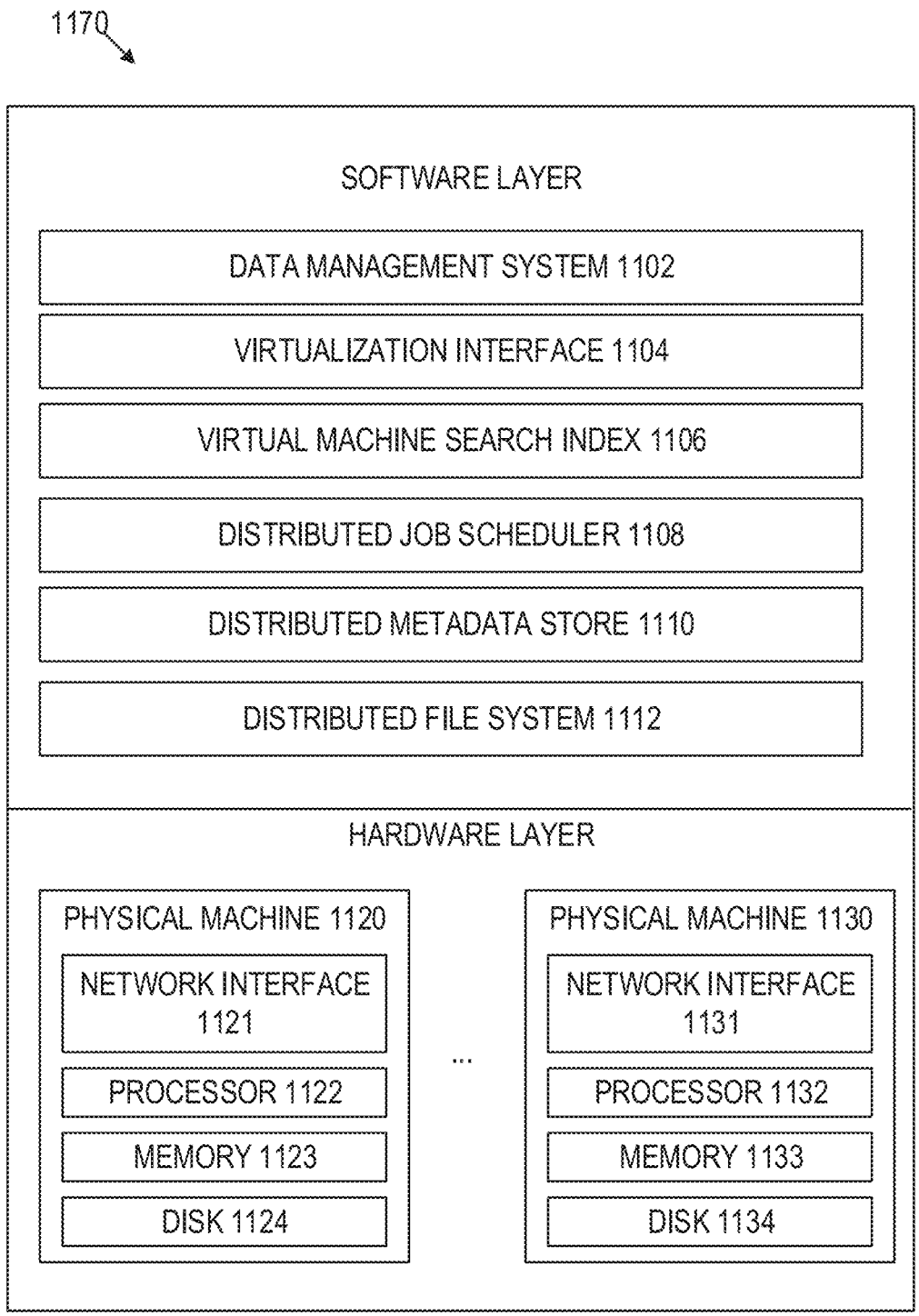
FIG. 7C is a block diagram illustrating a storage appliance, according to an embodiment.

FIG. 7C depicts one embodiment of storage appliance 1170 (e.g., server storage platform) in FIG. 7A. The storage appliance 1170 may include a plurality of physical machines that may be grouped together and presented as a single computing system. Each physical machine of the plurality of physical machines may comprise a node in a cluster (e.g., a failover cluster). In one example, the storage appliance 1170 may be positioned within a server rack within a data center. As depicted, the storage appliance 1170 includes hardware-level components and software-level components. The hardware-level components include one or more physical machines, such as physical machine 1120 and physical machine 1130. The physical machine 1120 includes a network interface 1121, processor 1122, memory 1123, and disk 1124 all in communication with each other. Processor 1122 allows physical machine 1120 to execute computer-readable instructions stored in memory 1123 to perform processes described herein. Disk 1124 may include a HDD and/or a SDD. The physical machine 1130 includes a network interface 1131, processor 1132, memory 1133, and disk 1134 all in communication with each other. Processor 1132 allows physical machine 1130 to execute computer-readable instructions stored in memory 1133 to perform processes described herein. Disk 1134 may include a HDD and/or a SSD. In some cases, disk 1134 may include a flash-based SSD or a hybrid HDD/SSD drive. In one embodiment, the storage appliance 1170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 1160 in FIG. 7A, or a hypervisor, such as hypervisor 1186 in FIG. 7B, to communicate with the storage appliance 1170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 1186 in FIG. 7B, may be configured with a first floating IP address associated with a first node in the cluster. The hypervisor may connect to the cluster using the first floating IP address. In one example, the hypervisor may communicate with the cluster using the NFS Version 3 protocol.

Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be (G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 7C, the software-level components of the storage appliance 1170 may include data management system 1102, a virtualization interface 1104, a distributed job scheduler 1108, a distributed metadata store 1110, a distributed file system 1112, and one or more virtual machine search indexes, such as virtual machine search index 1106. In one embodiment, the software-level components of the storage appliance 1170 may be run using a dedicated hardware-based appliance. In another embodiment, the software-level components of the storage appliance 1170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 1170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 1112 may present itself as a single file system, in which, as new physical machines or nodes are added to the storage appliance 1170, the cluster may automatically discover the additional nodes and automatically increase the available capacity of the file system for storing files and other data. Each file stored in the distributed file system 1112 may be partitioned into one or more chunks or shards. Each of the one or more chunks may be stored within the distributed file system 1112 as a separate file. The files stored within the distributed file system 1112 may be replicated or mirrored over a plurality of physical machines, thereby creating a load-balanced and fault-tolerant distributed file system. In one example, storage appliance 1170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 1110 may include a distributed database management system that provides high availability without a single point of failure. In one embodiment, the distributed metadata store 1110 may comprise a database, such as a distributed document-oriented database. The distributed metadata store 1110 may be used as a distributed key value storage system. In one example, the distributed metadata store 1110 may comprise a distributed NoSQL key value store database. In some cases, the distributed metadata store 1110 may include a partitioned row store, in which rows are organized into tables or other collections of related data held within a structured format within the key value store database. A table (or a set of tables) may be used to store metadata information associated with one or more files stored within the distributed file system 1112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 1112 and metadata associated with the new file may be stored within the distributed metadata store 1110. The distributed metadata store 1110 may also be used to store a backup schedule for the virtual machine and a list of snapshots for the virtual machine that are stored using the storage appliance 1170.

In some cases, the distributed metadata store 1110 may be used to manage one or more versions of a virtual machine. Each version of the virtual machine may correspond with a full image snapshot of the virtual machine stored within the distributed file system 1112 or an incremental snapshot of the virtual machine (e.g., a forward incremental or reverse incremental) stored within the distributed file system 1112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 1108 may be used for scheduling backup jobs that acquire and store virtual machine snapshots for one or more virtual machines over time. The distributed job scheduler 1108 may follow a backup schedule to back up an entire image of a virtual machine at a particular point-in-time or one or more virtual disks associated with the virtual machine at the particular point-in-time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 1108 may schedule a specific job to be run on a particular node based on data stored on the particular node. For example, the distributed job scheduler 1108 may schedule a virtual machine snapshot job to be run on a node in a cluster that is used to store snapshots of the virtual machine in order to reduce network congestion.

The distributed job scheduler 1108 may comprise a distributed fault-tolerant job scheduler, in which jobs affected by node failures are recovered and rescheduled to be run on available nodes. In one embodiment, the distributed job scheduler 1108 may be fully decentralized and implemented without the existence of a master node. The distributed job scheduler 1108 may run job scheduling processes on each node in a cluster or on a plurality of nodes in the cluster. In one example, the distributed job scheduler 1108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 1110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 1108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and, in response, may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 1108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 1108 may ensure that each task of the series of tasks is executed based on the ordering of tasks. Tasks that do not have dependencies with each other may be executed in parallel.

In some cases, the distributed job scheduler 1108 may schedule each task of a series of tasks to be performed on a specific node in a cluster. In other cases, the distributed job scheduler 1108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 1108 may assign one or more tasks associated with a job to be executed on a particular node in a cluster based on the location of data required to be accessed by the one or more tasks.

In one embodiment, the distributed job scheduler 1108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 1199 in FIG. 7B, to create a frozen copy of the virtual machine and to transfer one or more chunks (or one or more files) associated with the frozen copy to a storage appliance, such as storage appliance 1170 in FIG. 7A. The one or more tasks may also include generating metadata for the one or more chunks, storing the metadata using the distributed metadata store 1110, storing the one or more chunks within the distributed file system 1112, and communicating with the virtualized infrastructure manager that the frozen copy of the virtual machine may be unfrozen or released from a frozen state.

The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 1112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

According to an embodiment, the distributed job scheduler 1108 may schedule one or more jobs that perform operations described in association with FIG. 3A, FIG. 3B, and FIG. 6C. For example, the one or more jobs may be embodied as the job module 204.

The virtualization interface 1104 may provide an interface for communicating with a virtualized infrastructure manager managing a virtualization infrastructure, such as virtualized infrastructure manager 1199 in FIG. 7B, and requesting data associated with virtual machine snapshots from the virtualization infrastructure. The virtualization interface 1104 may communicate with the virtualized infrastructure manager using an API for accessing the virtualized infrastructure manager (e.g., to communicate a request for a snapshot of a virtual machine). In this case, storage appliance 1170 may request and receive data from a virtualized infrastructure without requiring agent software to be installed or running on virtual machines within the virtualized infrastructure. The virtualization interface 1104 may request data associated with virtual blocks stored on a virtual disk of the virtual machine that have changed since a last snapshot of the virtual machine was taken or since a specified prior point-in-time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 1106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 1106 may be used to identify a version of the virtual machine that includes a particular version of a file (e.g., a particular version of a database, a spreadsheet, or a word processing document). In some cases, each of the virtual machines that are backed up or protected using storage appliance 1170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 1112 in FIG. 7C. The data management system 1102 may comprise an application running on the storage appliance that manages and stores one or more snapshots of a virtual machine. In one example, the data management system 1102 may comprise a highest-level layer in an integrated software stack running on the storage appliance. The integrated software stack may include the data management system 1102, the virtualization interface 1104, the distributed job scheduler 1108, the distributed metadata store 1110, and the distributed file system 1112.

In some cases, the integrated software stack may run on other computing devices, such as a server or computing device 1154 in FIG. 7A. The data management system 1102 may use the virtualization interface 1104, the distributed job scheduler 1108, the distributed metadata store 1110, and the distributed file system 1112 to manage and store one or more snapshots of a virtual machine. Each snapshot of the virtual machine may correspond with a point-in-time version of the virtual machine. The data management system 1102 may generate and manage a list of versions for the virtual machine. Each version of the virtual machine may map to or reference one or more chunks and/or one or more files stored within the distributed file system 1112. Combined together, the one or more chunks and/or the one or more files stored within the distributed file system 1112 may comprise a full image of the version of the virtual machine.

The modules, methods, engines, applications, and so forth described in conjunction with FIGS. 1A-8 are implemented in some embodiments in the context of multiple machines and associated software architectures. The sections below describe representative software architecture(s) and machine (e.g., hardware) architecture(s) that are suitable for use with the disclosed embodiment Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosure in different contexts from the disclosure contained herein.

Figure 8:
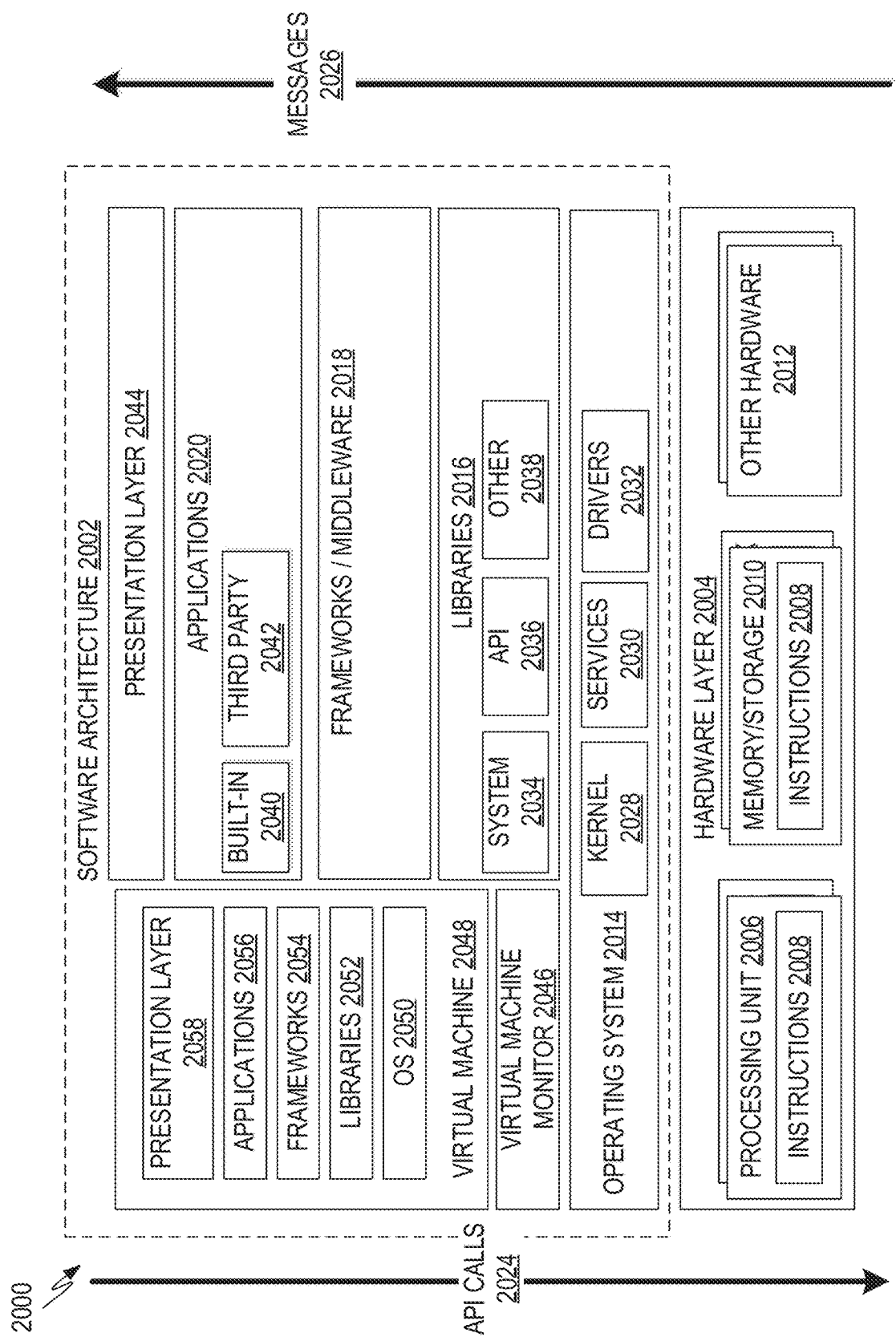
FIG. 8 is a block diagram illustrating a representative software architecture.

FIG. 8 is a block diagram 2000 illustrating a representative software architecture 2002, which may be used in conjunction with various hardware architectures herein described. FIG. 8 is merely a non-limiting example of a software architecture 2002, and it will be appreciated that many other architectures may be implemented to facilitate the functionality described herein. The software architecture 2002 may be executing on hardware such as a machine 2100 of FIG. 9 that includes, among other things, processors 2110, memory/storage 2130, and I/O components 2150. Returning to FIG. 8, a representative hardware layer 2004 is illustrated and can represent, for example, the machine 2100 of FIG. 9. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1A-7C. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 8, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphical user interface functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications as well as a broad assortment of other applications 2020. In a specific example, the third-party application 2042 (e.g., an application developed using the Android™ or iOS™ software development kit (SDK) by an entity other than the vendor of the particular platform) may be mobile software running on a mobile operating system 2014 such as iOS™ Android™, Windows® Phone, or other mobile operating systems 2014. In this example, the third-party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 8, this is illustrated by a virtual machine 2048. The virtual machine 2048 creates a software environment where applications/modules can execute as if they were executing on a hardware machine (such as the machine 2100 of FIG. 9, for example). The virtual machine 2048 is hosted by a host operating system (e.g., operating system 2014 in FIG. 8) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 9:
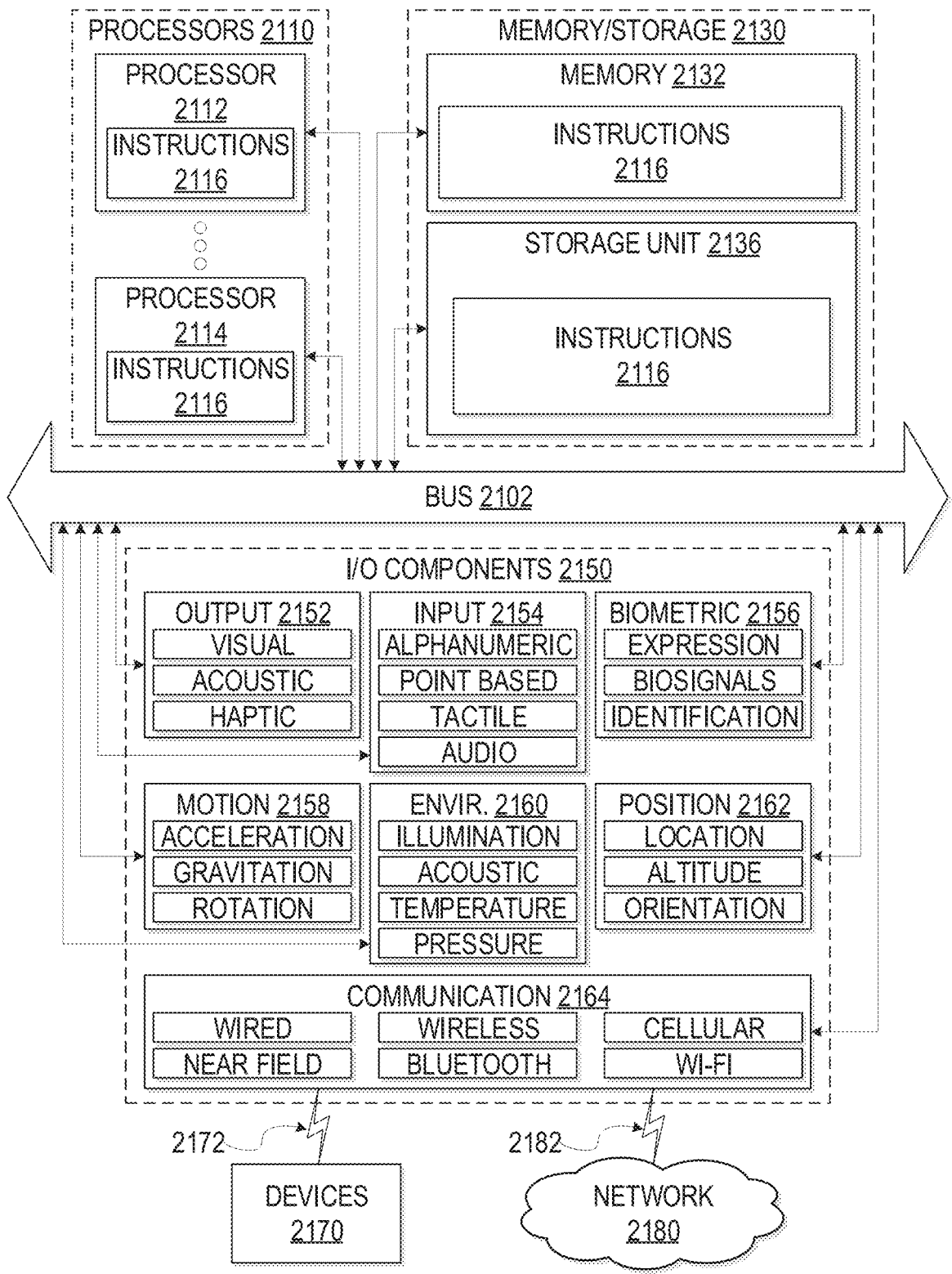
FIG. 9 is a block diagram illustrating components of a machine, according to some example embodiments.

FIG. 9 is a block diagram illustrating components of a machine 2100, according to some example embodiments, able to read instructions from a machine-storage medium and perform any one or more of the methodologies discussed herein. Specifically, FIG. 9 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIG. 3A, FIG. 3B, FIG. 5B, and FIG. 6C. Additionally, or alternatively, the instructions 2116 may implement the modules, engines, applications, and so forth, as described in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a CPU, a reduced instruction set computing (RISC) processor, a complex instruction set computing (CISC) processor, a GPU, a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 9 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-storage media.

As used herein, "machine-storage medium" means a device able to store the instructions 2116 and data temporarily or permanently and may include, but not be limited to, RAM, ROM, buffer memory, flash memory, optical media, magnetic media, cache memory, other types of storage (e.g., EEPROM), and/or any suitable combination thereof. The term "machine-storage medium" should be taken to include a single medium or multiple media (e.g., a centralized or distributed database, or associated caches and servers) able to store the instructions 2116. The term "machine-storage medium" shall also be taken to include any medium, or combination of multiple media, that is capable of storing instructions (e.g., instructions 2116) for execution by a machine (e.g., machine 2100), such that the instructions 2116, when executed by one or more processors of the machine (e.g., processors 2110), cause the machine to perform any one or more of the methodologies described herein. Accordingly, a "machine-storage medium" refers to a single storage apparatus or device, as well as "cloud-based" storage systems or storage networks that include multiple storage apparatus or devices. The term "machine-storage medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 9. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via IP geolocation, location via Wi-Fi® signal triangulation, location via detecting an NFC beacon signal that may indicate a particular location, and so forth.

In various example embodiments, one or more portions of the network 2180 may be an ad hoc network, an intranet, an extranet, a VPN, a LAN, a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170.

The term "signal medium" or "transmission medium" shall be taken to include any intangible medium that is capable of storing, encoding, or carrying the instructions 2116 for execution by the machine 2100, and includes digital or analog communications signals or other intangible media to facilitate communication of such software.

The terms "machine-readable medium," "computer-readable medium," and "device-readable medium" mean the same thing and may be used interchangeably in this disclosure. The terms are defined to include both machine-storage media and transmission medium. Thus, the terms include both storage devices/media and carrier waves/modulated data signals.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the at least one processor to perform operations comprising:
   receiving a database from a source host operating in a native database recovery environment, the database being received at a backup host operating in a foreign database recovery environment, the foreign database recovery environment utilizing foreign snapshot files and foreign incremental files for storing the database;
   receiving export information at the backup host, the export information including a tablespace identifier that identifies a tablespace including tablespace metadata information and a point-in-time that identifies file information for export from the backup host to the source host, the source host operating in the native database recovery environment;
   initiating a job, on the backup host, responsive to receiving the export information, the job executing to cause the at least one processor to perform operations further comprising:
   generating script information based on the export information, the script information including scripts including logic for execution on the source host to import of the tablespace metadata information, at the point-in-time, to the database on the source host;
   creating one or more directories on the backup host based on the export information;
   materializing the file information on the backup host, the file information including native snapshot files and native incremental files;
   utilizing an auxiliary database, at the backup host, to generate tablespace metadata information based on the file information; and
   communicating the tablespace metadata information and the script information and the file information, via the directories, and over a network, to the source host, to enable the source host to recover the tablespace in the database in the native database recovery environment.

2. The system of claim 1, wherein the database includes a wholesale distribution database and wherein the tablespace includes a shipping table and wherein the shipping table includes a plurality of rows of shipping information.

3. The system of claim 2, wherein the utilizing the auxiliary database includes:
   opening the auxiliary database;
   restoring the tablespace in the auxiliary database based on the native snapshot files and the tablespace identifier, the auxiliary database including the tablespace metadata information;
   recovering the tablespace in the auxiliary database based on the native incremental files and the tablespace identifier, the recovering including application of incremental changes to the auxiliary database to recover the tablespace in the auxiliary database to the point-in-time that was selected; and
   exporting the tablespace metadata information from the auxiliary database.

4. The system of claim 1, wherein the file information includes native snapshot files including the snapshots of an image of the database on the source host and native incremental files including incremental changes to the image of the database on the source host, and a native control file.

5. The system of claim 4, wherein the materializing the file information includes:
   selecting the foreign snapshot files and the foreign incremental files based on the point-in-time; and
   materializing the file information from the database on the backup host, wherein the file information includes the native snapshot tiles, the native incremental tiles, and the native control file.

6. The system of claim 1, wherein the communicating the tablespace metadata information and the script information and the file information, via the directories, to the source host includes utilizing a network file system protocol to communicate the tablespace metadata information and the script information, and the file information, via the directories, to the source host.

7. The system of claim 1, wherein the scripts include logic to:
   mount the directories;

recover the tablespace in the database, including:
   import the tablespace metadata information to the database;
   restore the tablespace in the database based on the native snapshot files and the tablespace identifier;
   recover the tablespace in the database based on the native incremental files and the tablespace identifier, the recovery including application of incremental changes to the database to recover the tablespace to the point-in-time that was selected; and
unmount the directories.

8. The system of claim 1, wherein the database is a standalone database and the backup host includes a first node including the backup node.

9. The system of claim 1, wherein the backup host comprises a plurality of nodes that stores a cluster database.

10. A method comprising:
   receiving a database from a source host operating in a native database recovery environment, the database being received at a backup host operating in a foreign database recovery environment, the foreign database recovery environment utilizing foreign snapshot files and foreign incremental files for storing the database, the receiving the database being performed by at least one processor;
   receiving export information at the backup host, the export information including a tablespace identifier that identifies a tablespace including tablespace metadata information and a point-in-time that identifies file information for export from the backup host to the source host, the source host operating in the native database recovery environment;
   initiating a job, on the backup host, responsive to receiving the export information, the job executing to cause the at least one processor to perform operations further comprising:
      generating script information based on the export information, the script information including scripts including logic for execution on the source host to import of the tablespace metadata information, at the point-in-time, to the database on the source host;
      creating one or more directories on the backup host based on the export information;
      materializing the file information on the backup host, the file information including native snapshot files and native incremental files;
      utilizing an auxiliary database, at the backup host, to generate tablespace metadata information based on the file information; and
   communicating the tablespace metadata information and the script information and the file information, via the directories, and over a network, to the source host, to enable the source host to recover the tablespace in the database in the native database recovery environment.

11. The method of claim 10, wherein the database includes a wholesale distribution database and wherein the tablespace includes a shipping table and wherein the shipping table includes a plurality of rows of shipping information.

12. The method of claim 11, wherein the utilizing the auxiliary database includes:
   opening the auxiliary database;
   restoring the tablespace in the auxiliary database based on the native snapshot files and the tablespace identifier, the auxiliary database including the tablespace metadata information;
   recovering the tablespace in the auxiliary database based on the native incremental files and the tablespace identifier, the recovering including application of incremental changes to the auxiliary database to recover the tablespace in the auxiliary database to the point-in-time that was selected; and
   exporting the tablespace metadata information from the auxiliary database.

13. The method of claim 10, wherein the file information includes native snapshot files including the snapshots of an image of the database on the source host and native incremental files including incremental changes to the image of the database on the source host, and a native control file.

14. The method of claim 13, wherein the materializing the file information includes:
   selecting the foreign snapshot files and the foreign incremental files based on the point-in-time; and
   materializing the file information from the database on the backup host, wherein the file information includes the native snapshot files, the native incremental files, and the native control file.

15. The method of claim 10, wherein the communicating the tablespace metadata information and the script information and the file information, via the directories, to the source host includes utilizing a network file system protocol to communicate the tablespace metadata information and the script information, and the file information, via the directories, to the source host.

16. The method of claim 10, wherein the scripts include logic to:
   mount the directories;
   recover the tablespace in the database, including:
      import the tablespace metadata information to the database;
      restore the tablespace in the database based on the native snapshot files and the tablespace identifier;
      recover the tablespace in the database based on the native incremental files and the tablespace identifier, the recovery including application of incremental changes to the database to recover the tablespace to the point-in-time that was selected; and
   unmount the directories.

17. The method of claim 10, wherein the database is a standalone database and the backup host includes a first node including the backup node.

18. The method of claim 10, wherein the backup host comprises a plurality of nodes that stores a cluster database.

19. A non-transitory machine-storage medium and storing a set of instructions that, when executed by a processor, causes a machine to perform operations comprising:
   receiving a database from a source host operating in a native database recovery environment, the database being received at a backup host operating in a foreign database recovery environment, the foreign database recovery environment utilizing foreign snapshot files and foreign incremental files for storing the database;
   receiving export information at the backup host, the export information including a tablespace identifier that identifies a tablespace including tablespace metadata information and a point-in-time that identifies tile information for export from the backup host to the source host, the source host operating in the native database recovery environment;
   initiating a job, on the backup host, responsive to receiving the export information, the job executing to cause the processor to perform operations further comprising:

generating script information based on the export information, the script information including scripts including logic for execution on the source host to import of the tablespace metadata information, at the point-in-time, to the database on the source host;

creating one or more directories on the backup host based on the export information;

materializing the tile information on the backup host, the file information including native snapshot files and native incremental files;

utilizing an auxiliary database, at the backup host, to generate tablespace metadata information based on the file information; and communicating the tablespace metadata information and the script information and the file information, via the directories, and over a network, to the source host, to enable the source host to recover the tablespace in the database in the native database recovery environment.

20. The non-transitory machine-storage medium of claim 19, wherein the database includes a wholesale distribution database and wherein the tablespace includes a shipping table and wherein the shipping table includes a plurality of rows of shipping information.

* * * * *

UNITED STATES PATENT AND TRADEMARK OFFICE
CERTIFICATE OF CORRECTION

PATENT NO. : 11,194,761 B2
APPLICATION NO. : 16/777039
DATED : December 7, 2021
INVENTOR(S) : Khandkar et al.

It is certified that error appears in the above-identified patent and that said Letters Patent is hereby corrected as shown below:

In the Specification

In Column 3, Line 58, after "106.", delete a linebreak

In Column 12, Line 63, delete "FIG. 3," and insert --FIG. 3B,-- therefor

In Column 15, Line 20, after "128.", delete a linebreak

In Column 18, Line 47, delete "(SDS)," and insert --(SSD),-- therefor

In Column 19, Line 24, after "GPUs.", delete a linebreak

In Column 20, Line 16, delete "SDS," and insert --SSD,-- therefor

In Column 32, Line 48, after "iOS™", insert --,--

In the Claims

In Column 38, Line 56, in Claim 5, delete "snapshot tiles," and insert --snapshot files,-- therefor In Column 38, Line 56, in Claim 5, delete "incremental tiles," and insert --incremental files,-- therefor In Column 40, Line 61, in Claim 19, delete "tile" and insert --file-- therefor In Column 41, Line 8, in Claim 19, delete "tile" and insert --file-- therefor Signed and Sealed this
Twelfth Day of September, 2023

Katherine Kelly Vidal
*Director of the United States Patent and Trademark Office*